United States Patent
Paauwe et al.

(10) Patent No.: US 11,667,435 B2
(45) Date of Patent: Jun. 6, 2023

(54) CONTAINER, PREFORM ASSEMBLY AND METHOD AND APPARATUS FOR FORMING CONTAINERS

(71) Applicant: HEINEKEN SUPPLY CHAIN B.V., Amsterdam (NL)

(72) Inventors: Arie Maarten Paauwe, Naaldwijk (NL); Bart Jan Bax, Blaricum (NL); Harold Marcel Blom, Houten (NL)

(73) Assignee: HEINEKEN SUPPLY CHAIN B.V., Amsterdam (NL)

( * ) Notice: Subject to any disclaimer, the term of this patent is extended or adjusted under 35 U.S.C. 154(b) by 0 days.

(21) Appl. No.: 16/892,209

(22) Filed: Jun. 3, 2020

(65) Prior Publication Data

US 2020/0290768 A1 Sep. 17, 2020

Related U.S. Application Data

(63) Continuation of application No. 15/606,513, filed on May 26, 2017, now Pat. No. 10,710,771, which is a
(Continued)

(30) Foreign Application Priority Data

Nov. 13, 2012 (NL) ..................................... 2009802

(51) Int. Cl.
*B65D 23/02* (2006.01)
*B65D 25/16* (2006.01)
(Continued)

(52) U.S. Cl.
CPC .............. *B65D 23/02* (2013.01); *B29B 11/04* (2013.01); *B29B 11/08* (2013.01); *B29B 11/16* (2013.01);
(Continued)

(58) Field of Classification Search
CPC ........ B65D 1/40; B65D 1/023; B65D 1/0215; B65D 23/02; B65D 25/16; B65D 25/14;
(Continued)

(56) References Cited

U.S. PATENT DOCUMENTS 3,143,364 A * 8/1964 Klein ..................... C09J 123/06
264/269
3,547,294 A * 12/1970 Williams ............... B65D 23/02
264/129
(Continued)

FOREIGN PATENT DOCUMENTS

CA 2683614 A1 * 10/2008 ............. B29B 11/14
CN 1321132 A 11/2001
(Continued)

OTHER PUBLICATIONS

Translation of JP2002326220, Fukushima et al., Nov. 2002, Paragraph 11 (Year: 2002).*
(Continued)

*Primary Examiner* — Robert J Hicks
(74) *Attorney, Agent, or Firm* — Pearne & Gordon LLP

(57) ABSTRACT

Container comprising an inner container and an outer container with facing surfaces, wherein at least part of at least one of the facing surfaces has a surface roughness higher than about 0.1 Ra and/or wherein the difference in roughness of the facing surfaces is at least over a part more than about 0.1 Ra.

24 Claims, 13 Drawing Sheets

Related U.S. Application Data continuation of application No. 14/442,205, filed as application No. PCT/NL2013/050813 on Nov. 13, 2013, now Pat. No. 9,714,117.

(51) Int. Cl.

| | | |
|---|---|---|
| B29C 49/06 | (2006.01) | |
| B29C 49/08 | (2006.01) | |
| B65D 1/02 | (2006.01) | |
| B29B 11/04 | (2006.01) | |
| B29B 11/08 | (2006.01) | |
| B29B 11/16 | (2006.01) | |
| B29K 105/04 | (2006.01) | |
| B29C 49/22 | (2006.01) | |
| B29K 67/00 | (2006.01) | |
| B29K 105/16 | (2006.01) | |
| B29K 105/00 | (2006.01) | |
| B29L 31/00 | (2006.01) | |

(52) U.S. Cl.
CPC .............. B29C 49/06 (2013.01); B29C 49/08 (2013.01); B65D 1/023 (2013.01); B65D 1/0215 (2013.01); B65D 25/16 (2013.01); B29C 49/22 (2013.01); B29C 2949/077 (2022.05); B29C 2949/0772 (2022.05); B29C 2949/302 (2022.05); B29C 2949/3008 (2022.05); B29C 2949/3012 (2022.05); B29C 2949/3016 (2022.05); B29C 2949/3026 (2022.05); B29C 2949/3028 (2022.05); B29C 2949/3032 (2022.05); B29K 2067/003 (2013.01); B29K 2105/04 (2013.01); B29K 2105/16 (2013.01); B29K 2105/253 (2013.01); B29L 2031/7158 (2013.01)

(58) Field of Classification Search
CPC ......... B65D 11/20; B65D 13/02; B29C 49/06; B29C 49/08; B29C 49/221; B29C 49/22; B29B 11/04; B29B 11/08; B29B 11/16; F17C 1/16; F17C 1/00
USPC ....... 220/586, 581, 62.22, 62.21, 62.11, 665, 220/662; 428/35.8, 35.7, 36.4; 215/12.1
See application file for complete search history.

(56) References Cited

U.S. PATENT DOCUMENTS

| | | | |
|---|---|---|---|
| 4,044,188 A | 8/1977 | Segal | |
| 4,427,122 A | 1/1984 | Jakobsen | |
| 4,755,405 A * | 7/1988 | Massucco | B65D 55/026 215/901 |
| 4,781,954 A * | 11/1988 | Krishnakumar | B29C 45/1643 264/328.8 |
| 5,114,779 A | 5/1992 | Hopperdietzel | |
| 5,142,071 A | 8/1992 | Kluesener et al. | |
| 5,217,768 A | 6/1993 | Walters et al. | |
| 5,301,838 A | 4/1994 | Schmidt et al. | |
| 5,332,121 A | 7/1994 | Schmidt et al. | |
| 5,407,629 A | 4/1995 | Schmidt et al. | |
| 5,575,400 A | 11/1996 | Turner et al. | |
| 5,817,402 A | 10/1998 | Miyake et al. | |
| 6,130,536 A | 10/2000 | Powell et al. | |
| 6,238,201 B1 | 5/2001 | Safian | |
| 6,243,936 B1 | 6/2001 | Biesecker et al. | |
| 6,323,271 B1 | 11/2001 | Caldwell et al. | |
| 6,412,668 B1 | 7/2002 | Vlooswijk et al. | |
| 6,415,963 B1 | 7/2002 | Vlooswijk et al. | |
| 6,592,956 B2 | 7/2003 | Slat | |
| 6,632,493 B1 | 10/2003 | Hildebrand, IV et al. | |
| 6,745,922 B1 | 6/2004 | Vlooswijk et al. | |
| 6,746,769 B2 | 6/2004 | Slat | |
| 7,048,975 B1 | 5/2006 | Tojo et al. | |
| 7,661,556 B2 | 2/2010 | Van Der Klaauw et al. | |
| 7,717,697 B2 | 5/2010 | Hutchinson et al. | |
| 8,192,812 B2 | 6/2012 | Shi et al. | |
| 8,211,520 B2 | 7/2012 | Abe et al. | |
| 8,397,932 B2 | 3/2013 | Ichikawa et al. | |
| 8,518,504 B2 | 8/2013 | Abe et al. | |
| 8,580,365 B2 | 11/2013 | Abe et al. | |
| 8,685,512 B2 | 4/2014 | Abe et al. | |
| 9,211,993 B2 | 12/2015 | Tom et al. | |
| 9,382,028 B2 | 7/2016 | Scantlebury et al. | |
| 9,393,725 B2 | 7/2016 | Abe et al. | |
| 9,486,939 B1 | 11/2016 | Abe et al. | |
| 9,650,169 B2 | 5/2017 | Tom et al. | |
| 9,714,117 B2 | 7/2017 | Paauwe et al. | |
| 2002/0127333 A1 | 9/2002 | Slat | |
| 2003/0207058 A1 | 11/2003 | Slat | |
| 2004/0069368 A1 | 4/2004 | Van Der Klaauw et al. | |
| 2004/0222223 A1 | 11/2004 | Swenson | |
| 2004/0226967 A1 | 11/2004 | Van Der Klaauw et al. | |
| 2005/0089658 A1 | 4/2005 | Scantlebury et al. | |
| 2005/0136201 A1 | 6/2005 | Farha et al. | |
| 2005/0147795 A1 | 7/2005 | Kobayashi et al. | |
| 2006/0006586 A1 | 1/2006 | Farha et al. | |
| 2006/0073294 A1 | 4/2006 | Hutchinson et al. | |
| 2006/0210746 A1 | 9/2006 | Shi et al. | |
| 2007/0108668 A1 | 5/2007 | Hutchinson et al. | |
| 2008/0257883 A1 | 10/2008 | Van Hove et al. | |
| 2008/0317989 A1 | 12/2008 | Abe et al. | |
| 2009/0026198 A1 | 1/2009 | Ichikawa et al. | |
| 2009/0166240 A1 * | 7/2009 | Scarola | B65D 41/0485 206/524.2 |
| 2009/0169786 A1 | 7/2009 | Dierick | |
| 2010/0227092 A1 * | 9/2010 | Semersky | B32B 27/304 428/36.5 |
| 2011/0049193 A1 | 3/2011 | Muller Kubold et al. | |
| 2011/0115122 A1 | 5/2011 | Abe et al. | |
| 2011/0123744 A1 | 5/2011 | Sato et al. | |
| 2012/0132607 A1 | 5/2012 | Landman et al. | |
| 2012/0171401 A1 * | 7/2012 | Katou | B32B 27/32 428/35.7 |
| 2012/0263900 A1 | 10/2012 | Abe et al. | |
| 2012/0263901 A1 | 10/2012 | Abe et al. | |
| 2013/0129955 A1 * | 5/2013 | Gleixner | B65D 1/0215 264/294 |
| 2013/0149480 A1 * | 6/2013 | Ichikawa | B29C 44/0407 428/36.5 |
| 2013/0284737 A1 * | 10/2013 | Ju | B32B 9/007 264/261 |
| 2013/0313217 A1 | 11/2013 | Yamamoto et al. | |
| 2014/0044904 A1 * | 2/2014 | De Belder | B65D 1/0215 428/323 |
| 2014/0076837 A1 | 3/2014 | Abe et al. | |
| 2014/0202975 A1 | 7/2014 | Glenn et al. | |
| 2015/0175399 A1 | 6/2015 | Witte et al. | |
| 2015/0203342 A1 | 7/2015 | Witte et al. | |
| 2015/0210523 A1 | 7/2015 | Witte et al. | |
| 2015/0210524 A1 | 7/2015 | Witte et al. | |
| 2015/0282651 A1 | 10/2015 | Paauwe et al. | |
| 2015/0284157 A1 | 10/2015 | Paauwe et al. | |
| 2016/0145003 A1 | 5/2016 | Glenn et al. | |
| 2016/0236806 A1 | 8/2016 | Glenn et al. | |
| 2016/0236820 A1 | 8/2016 | Paauwe et al. | |
| 2016/0318209 A1 | 11/2016 | Abe et al. | |
| 2016/0332768 A1 | 11/2016 | Ichikawa et al. | |
| 2017/0217049 A1 | 8/2017 | Landman et al. | |
| 2017/0283118 A1 | 10/2017 | Paauwe et al. | |

FOREIGN PATENT DOCUMENTS

| | | |
|---|---|---|
| CN | 101003310 A | 7/2007 |
| CN | 101172525 A | 5/2008 |
| CN | 101203369 A | 6/2008 |
| CN | 101733859 A | 6/2010 |
| EA | 200701973 A1 | 4/2008 |
| EP | 1289874 A2 | 3/2003 |
| EP | 1547768 A1 | 6/2005 |
| EP | 1902960 A1 | 3/2008 |

(56) References Cited

FOREIGN PATENT DOCUMENTS

| | | |
|---|---|---|
| EP | 2110174 A1 | 10/2009 |
| EP | 2508318 A1 | 10/2012 |
| EP | 2920080 B1 | 9/2015 |
| JP | S5929130 A | 2/1984 |
| JP | H06-345069 A | 12/1994 |
| JP | H0952280 A | 2/1997 |
| JP | H11192656 A | 7/1999 |
| JP | 2000062745 A | 2/2000 |
| JP | 2002326220 A * | 11/2002 ............ B29B 11/08 |
| JP | 2002326220 A | 11/2002 |
| JP | 2009190780 A | 8/2009 |
| JP | 2012532045 A | 12/2012 |
| RU | 70500 U1 | 1/2008 |
| WO | 91/08099 A1 | 6/1991 |
| WO | 91/09099 A1 | 6/1991 |
| WO | 92/12926 A1 | 8/1992 |
| WO | 0035773 A1 | 6/2000 |
| WO | 0035774 A1 | 6/2000 |
| WO | 0035803 A1 | 6/2000 |
| WO | 01/10725 A1 | 2/2001 |
| WO | 0126978 A1 | 4/2001 |
| WO | 01/92144 A2 | 12/2001 |
| WO | 03064267 A2 | 8/2003 |
| WO | 2007027606 A1 | 3/2007 |
| WO | 2008048098 A1 | 4/2008 |
| WO | 2010010803 A1 | 1/2010 |
| WO | 2011002293 A1 | 1/2011 |
| WO | 2011002294 | 1/2011 |
| WO | 2011002294 A2 | 1/2011 |
| WO | 2012114742 A1 | 8/2012 |
| WO | 2012118527 A1 | 9/2012 |
| WO | 2014017907 A2 | 1/2014 |
| WO | 2014017908 A1 | 1/2014 |
| WO | 2014017909 A1 | 1/2014 |
| WO | 2014017910 A1 | 1/2014 |
| WO | 2014070003 A1 | 5/2014 |
| WO | 2014070004 A2 | 5/2014 |
| WO | 2012114742 A1 | 7/2014 |

OTHER PUBLICATIONS

Meine, K., et al., "The Influence of Surface Roughness on the Adhesion Force", Surface and Interface Analysis, DOI:10.1002/sia.1738, 2004; 36; 694-697.

Silberline Product Data and Selection Guide, 2008, 12 pages.

Surface Roughness Table; available at http://www.csbslidingbearings.eom/uploads/1/5/6/9/15694310/surface_roughness.pdf, retrieved Jul. 30, 2018, 1 page.

Surface Roughness Technical Data, available at https://my.misumi-ec.com/pdf.tech/mech/p2839.pdf, retrieved Jul. 30, 2018, 1 page.

Wheeler, I.R., "Metallic Pigments in Polymers", 1999, iSmithers Rapra Publ. p. 69-80 and 126.

\* cited by examiner

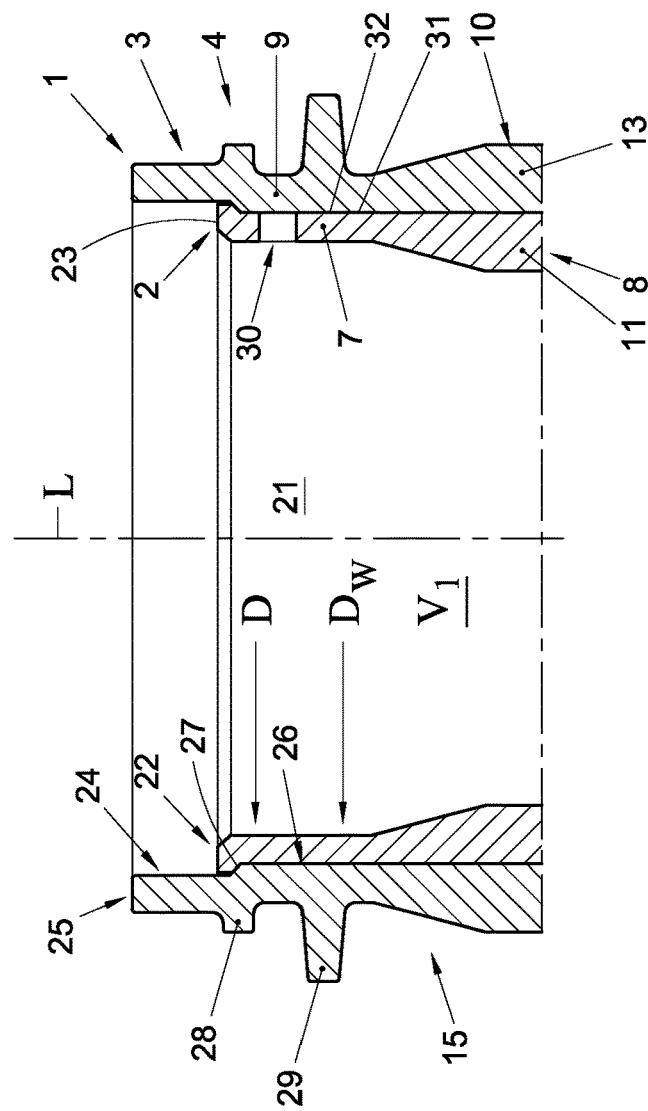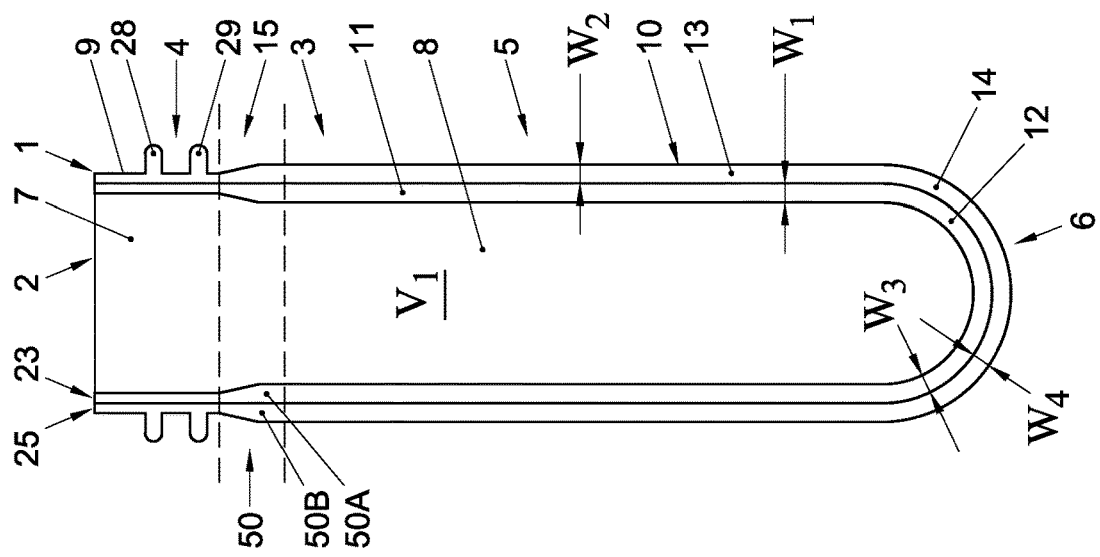

TABLE 3

| No. | Thickness | Medium | Delamination start pressure (bar) |
|---|---|---|---|
| AK-BO-0147 | 5 | Air | 1.38 |
| AK-BO-0147 | 5 | Water | 2.00 |
| AK-BO-0148 | 5 | Air | 0.63 |
| AK-BO-0148 | 5 | Water | 1.67 |
| AK-BO-0149 | 5 | Air | 0.38 |
| AK-BO-0149 | 5 | Water | 0.31 |
| AK-BO-0150 | 5 | Air | 0.25 |
| AK-BO-0150 | 5 | Water | 0.22 |

Table 4.1.1: Delamination start pressures

FIG. 15

CONTAINER, PREFORM ASSEMBLY AND METHOD AND APPARATUS FOR FORMING CONTAINERS

CROSS-REFERENCE TO RELATED APPLICATIONS

The present application is a continuation of U.S. patent application Ser. No. 15/606,513 filed May 26, 2017, which is a continuation of U.S. patent application Ser. No. 14/442,205 filed May 12, 2015, now U.S. Pat. No. 9,714,117.

FIELD OF THE INVENTION

The invention relates to a container and preform assembly for such container. The invention further relates to a method and apparatus for forming container. The invention relates especially to plastic blow moulded containers.

DESCRIPTION OF RELATED ART

For forming plastic containers such as bottles it is a well known technique to blow mould, for example stretch blow mould a container from an injection moulded preform. Such preform comprises a neck portion comprising an opening in fluid communication with an interior space of the preform, and a body portion, containing said interior space, surrounded by a wall and bottom portion. During the blow moulding process the preform is heated and is placed inside a blow mould, after which a stretching rod is inserted into the preform and air is injected into the interior space, for stretching the wall and bottom portion, forcing them against the inside of the blow mould, bringing the container in the desired shape. Then the container is allowed to cool down, to retain that shape.

It is commonly known to blow mould a container from a mono material preform, leading to a mono material container, having the same material properties on the inside and the outside.

JP2000-062745 and JP06-345069 disclose methods for forming a container, in which a multi layer preform is injection moulded and subsequently blown into a multi layer container. An opening is provided in the outer layer of the preform, to the inner layer, such that in the container the inner layer can at least partly be forced away from the outer layer in the neck area, to allow pressure balancing when the inner layer is deformed during use, for example when a product is dispensed from the inner space of the container. This means that the outer layer will remain or at least retain it original blow moulded shape during or after such dispensing.

EP1547768 discloses a method for forming a blow moulded container, in which a preform is injection moulded and subsequently part of the outside of the preform is provided with an outer layer of plastic, by a second moulding step. Then the preform is blown into a blow moulded, double layer container.

WO91/08099 discloses a method for forming a blow moulded container, wherein a first and second preform are injection moulded separately, where after the first, having a neck portion, is inserted into the inner space of the second preform, without a neck portion. The outer surface of the first preform below the neck portion lies against the inner surface of the second, outer preform. The two preforms are then blow moulded together into a multi layer bottle. In this document it is discussed that this can increase strength and impermeability of the blow moulded container and that it will increase efficiency and flexibility in the manufacturing process. This method is described as especially useful for containers having a content of between 1.5 and 3 litres.

WO92/012926 discloses a multi layer bottle, having a delaminating inner layer, blow moulded from a multi layer preform. An opening is provided near the bottom portion of the container, through the outer layer, such that air can be introduced through the opening, forcing the delamination of the inner layer. This means that the content of the container can be pressurised without the air coming into contact with the contents.

In these and other known double walled or multilayered containers, especially blow moulded containers, in which it is desired or necessary that an inner layer or inner container can be released from an adjacent layer or container, such as an intermediate or outer layer, such release is often a problem, especially controlled release at a sufficiently low pressure. This is especially but not exclusively a problem if similar or even the same materials are used for both layers of containers. In the art it is known to use different materials for the inner and outer container or layer, which do not adhere to each other when blow moulding the container. Additionally or alternatively it is known, for example from WO91/09099, to provide for a release agent between the two layers or containers, in order to prevent such adherence of the adjacent containers or layers or at least easy delamination thereof.

The present invention has as an object to provide alternatives for the above mentioned containers and methods for forming containers.

The present invention has as a further or alternative object to provide containers which, in blow moulded state, have a content of more than three litres, such as but not limited to more than 5 litres, such as for example between 8 and 40 litres, such as 10, 20 or 30 litres.

The present invention has as a further or alternative object to provide containers which are coloured and/or comprise a scavenger for limiting or preventing gas migration through the wall of a container and/or scavenger oxygen and/or components of air.

The present invention has as a further or alternative object to provide for a container in which an inner container or layer can easily release from an adjacent container or layer by controlling the pressure between said layers or containers, especially by increasing the pressure between said layers or containers. The pressure increase preferably is kept relatively low, more preferably in accordance with a desired pressure within the container for maintaining the integrity of the content therein.

In this disclosure reference will be made to inner and outer containers or preforms, which should either one or both also be understood as including inner and outer layers of a container or preform.

SUMMARY OF THE INVENTION

A preform assembly according to the description can be characterised by at least an outer preform and an inner preform, fitting at least partly inside the outer preform, both having a neck forming portion, a shoulder forming portion and a body forming portion. At least one of the inner and outer preform has a surface region in contact with the other of the inner and outer preform, wherein at least part of said region has a surface roughness of at least 0.1 Ra and/or a surface roughness which is at least 0.1 Ra higher than the surface roughness of the surface area of the other of the inner and outer preform with which it is in contact. Alternatively or additionally the said at least part of the surface region has a roughness such that in a container integrally blow moulded from said assembly of preforms the surface area of one of the containers formed from said surface region has a surface roughness of at least 0.1 Ra and/or a surface roughness of at least 0.1 Ra higher than the surface roughness of an adjacent surface area of the adjacent container.

A container according to the description can be characterized by an inner container and an outer container with facing surfaces. At least part of at least one of the facing surfaces has a surface roughness higher than about 0.1 Ra. Additionally or alternatively a difference in roughness of said facing surfaces is at least over a part more than about 0.1 Ra. The container is preferably blow moulded from a preform or set of preforms, more preferably integrally blow moulded from a set of preforms comprising at least an inner and an outer preform.

A method for forming a preform assembly for blow moulding a container according to the description can be characterized by a method in which a first preform is injection moulded and a second preform is injection moulded, wherein the first preform is inserted into the second preform and/or the second preform is provided over the first preform. At least one of the preforms, preferably the first preform, is injection moulded from a plastic mass containing particles different from the plastic, especially metal and/or metalized particles, such as metal and/or metalized flakes.

An apparatus for providing a preform assembly can be characterized by comprising at least one first mould cavity for forming a first preform and at least one second mould cavity for forming a second preform. The apparatus can further comprise at least one transfer device for moving a first preform into a second preform and/or a second preform over a first preform.

BRIEF DESCRIPTION OF THE DRAWINGS

Some further advantageous embodiments of a preform assembly, container, method and apparatus are described in the further claims. Some embodiments will be described hereafter in relation to the drawings, by way of example only and which should by no means be understood as limiting the scope of the invention as claimed in any way. Herein shows:

FIG. 1 schematically in cross section a preform assembly in a first embodiment;

FIG. 1A schematically a detail of the neck area of a preform assembly;

FIG. 15 shows Table 3 where the mean value is given of the starting pressure, for four types of containers, filled with air and filled with water.

DETAILED DESCRIPTION OF PREFERRED EMBODIMENTS OF THE INVENTION

Figure 3:
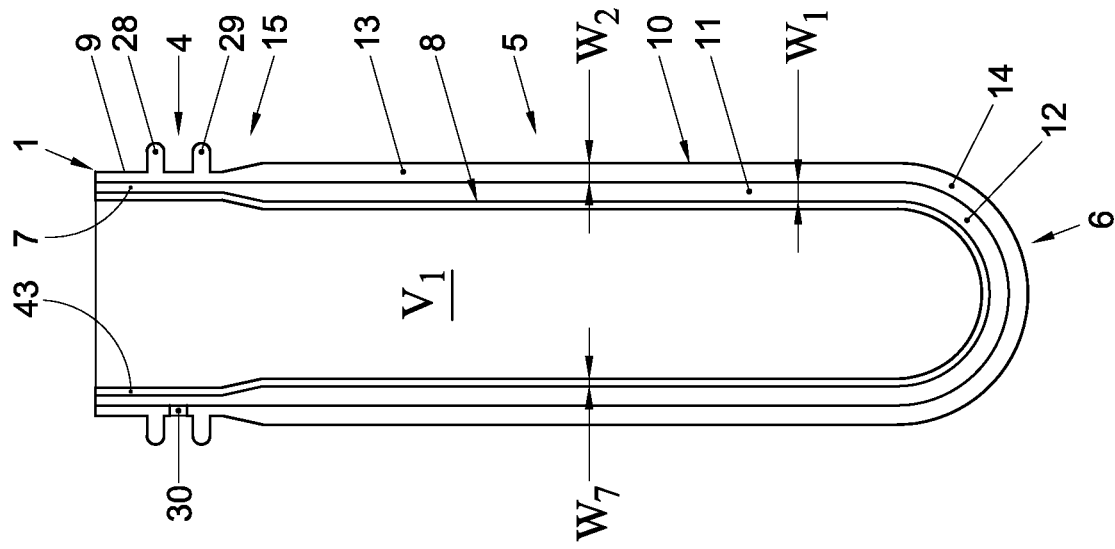
FIG. 3 schematically in cross section a preform assembly in a third embodiment.

In this description and the drawings the same or corresponding elements have the same or corresponding reference signs. The embodiments shown and/or described are given by way of example only and are not to be considered limiting in any way. Many variations are possible within the scope of the present disclosure, which variations of for example parts of or combinations of parts of the embodiments shown also are considered to have been disclosed.

In this description blow moulding has to be understood as at least comprising but not limited to stretch blow moulding, wherein a preform is heated, stretched lengthwise and blown into a desired shape. During lengthwise stretching the preform can already be blown to some extent.

In this description a preform, which can also be a parison, has to be understood as at least including but not limited to an element injection moulded from plastic, to be blown into a blow moulded container. In this description preforms shall be described for blow moulding containers which basically have a bottle shape, including a neck portion, a body portion and a bottom portion, but it will be obvious to any skilled person that different shapes of containers can be made using different shapes of preforms falling within the same inventive concept. A preform can be single or multi layer. A multi layer preform can be manufactured using well known techniques, such as but not limited to co-injection, co-extrusion or over moulding. A multi layer preform can have a delaminating layer or layers. Preform sets or assemblies can be formed from two or more preforms, assembled or co-moulded, for example by over moulding.

In this description wording like about and substantially should be understood as meaning that variations of a given value it refers to are allowable within the given definition, which variations can at least be 5%, preferably at least 10% and more preferably at least 15% of the given value. In this description up and down, top and bottom and the like are used in their common sense, as for example shown in FIG. 4 with respect to a container standing on a bottom portion 6.

In this description preforms and containers will be discussed made of PET or PET blends. However, preforms and containers according to the present disclosure could also be made of different materials, blends or combinations of materials, such as but not limited to polypropylene or polystyrene, PEN, polyethylene, Polycarbonate, PBT, blends of the forgoing or combinations thereof. In case of PET or PET blends, standard PET has to be understood in this respect as at least including PET without added additives for preventing crystallisation of the PET during forming such as injection moulding of a preform.

In this description reference shall be made to containers for holding and dispensing beverages, especially carbonated beverages such as beer and soft drinks. However other contents can be stored and dispensed using a container according to this description.

In the present disclosure preforms can be formed of a plastic material that can be stretch blow moulded into a container having a relatively thin wall or combination of walls, wherein the preform is substantially amorf, whereas the bottle is at least partly crystalline. Preferably the preform is formed of a material substantially free of crystallisation preventing additives, such as glycol or co-monomers as isophtalic acid or cyclohexanedimethanol. It has been recognised that such additives can be favourable in injection moulding a preform substantially amorf, but these additives remain in the blown container, which is detrimental to the strength and/or stiffness of the container. The preforms are preferably injection moulded having a wall thickness sufficiently small to substantially prevent crystallisation of the plastic material.

In this description stretch blow molding is described for forming containers from preform assemblies. These containers are preferably blow molded at a temperature just above the glass transition temperature of the plastics material. More preferably the plastics material is conditioned, stretched and orientated just above the glass transition temperature of the plastics material.

In a container according to this description in the plastics material can have a degree of crystallization. In embodiments the preforms of a preform assembly can be stretch blow molded such that they obtain a different degree of crystallization. This effect can be obtained by stretching the plastics material of the different preforms to a different ratio, especially to a different axial ratio, hoop ration and/or blow up ratio, by stretching and blow molding at different temperatures, by influencing the heating and/or cooling temperatures of the different preforms or by combinations thereof. In other embodiments different preforms of the assembly can be made of different materials or blends.

In all embodiments disclosed or described an axial length of an inner preform can be smaller than the axial length of the outer container and/or an diameter of the inner preform can be smaller than the inner diameter of the outer container, such that adjacent parts of the preforms can be spaced apart, allowing the inner container to be stretched and/or blown either axially or diametrically or in both direction before the outer container is directly or indirectly engaged thereby and is stretched and/or blow molded too.

In a container according to the description there are preferably at least an inner container and an outer container, the inner container formed from an inner preform, the outer container formed from an outer preform. Inner has to be understood as at least meaning extending substantially within the outer preform or container, and does not necessarily refer to an innermost preform or container. Preferably at least one of and more preferably both the outer and inner container have areas of crystallization connected by amorphous portions. In an embodiment the outer container can have a lower degree of crystallization than the inner container, such that the inner container is stronger and the outer container is more impact resistant. The outer container can for example have a crystallization rate of between 14 and 22% of the material, preferably measured by volume, whereas the inner container can for example have a higher rate of crystallization, for example between 22 and 35% or higher, such as between 28 and 32%, wherein higher degrees are preferred. This can for example be obtained by increasing the temperature of the inner preform or by stretch blow molding to a higher ratio.

In embodiments of containers according to this description a part of at least the wall of a body forming portion and/or of the bottom forming portion of an inner or outer container can be made thicker than the further parts of the same body forming portion or bottom forming portion. Surprisingly it has been recognized that such areas in stretch blow molded containers, especially in crystallizing materials, form weak areas of the containers which can be exploited to provide designated failure areas in the container. This has to be understood as meaning at least that if for example the internal pressure in the container is becoming higher than a desired maximum value or if the container is pierced, resulting in sudden pressure changes, the container will fail mainly or entirely in at least one of these designated failure areas. This can increase user safety further.

In the present disclosure preforms and containers formed there from are described, made of plastic. To this end a plastic mass is used, for example formed from melting plastic pallets or the like, in a known manner, for example in an extruder, which mass is then injection moulded in a known manner into the or each preform. In this description to such mass particles can be added, different from the plastics from which the mass is made. Particles are to be understood at least as, but not limited to entities which are relatively small compared to for example wall thickness of the preforms, and will be contained in a dispersed manner throughout the preform made from said mass, and thus also through the container or at least part thereof made from said mass comprising said particles. The particles can be flakes, and can be made of or using metal or metalizing. The particles are preferable made of a material such that they maintain there integrity during both injection moulding and blow moulding.

In this disclosure flakes should be understood as including, but not limited to, particles having a substantially sheet like appearance, which could be understood as having a thickness in one direction smaller than in directions perpendicular to said one direction. The particles can have any shape or form, for example having single or multiple curved surfaces or flat surfaces. Particles can have or be enclosed at least partly in a covering layer of a different material, for example a material having a lower melting temperature than the plastic, or a lower melting temperature than the glass transition temperature of the plastic. The covering layer can be made of for example a wax or wax like material. In a preferred embodiment material of the covering layer is mostly contained within the wall of the relevant preform and/or container formed there from, such that it is not precipitated from the wall. In a preform formed from such mass the particles are believed to be contained in a dispersed manner between monomer and/or polymer chains of the plastic. The material at least partly covering the particles may interact with the monomers and/or polymers or parts thereof. In embodiments the particles can be distributed substantially evenly through the wall of a container or part thereof formed from the preform. In embodiments the particles can be distributed unevenly through the wall of a container or part thereof formed from the preform, for example such that during injection moulding and/or blow moulding at least part of the particles is positioned in or near a surface or surface area of the preform and/or the container.

It has been found that by providing such particles in the wall of a preform and blow moulding a container from said preform, at least a surface or surface area or region of the container facing a wall of an adjacent container, especially the container part against which said surface region or area sis pressed during blow moulding, will be provided having a surface roughness higher than that which would be obtained without said particles. Even if the amount of particles is relatively small, for example between 0.2 and 5% in weight of the preform, more specifically between 0.3 and 3% in weight. It has been found that the surface roughness can be increased to for example above 0.1 Ra, more specifically above 0.3 Ra, such as for example about 0.35 Ra or more, for a container blow moulded from a preform made with PET or a PET blend, which would have a surface roughness of between about 0.05 and 0.1 when formed from a preform without such particles. Surprisingly it has been found that by increasing the surface roughness of a surface region or area of a container facing an adjacent container, wherein the first can for example be an inner container and the latter the outer container or vice versa, the pressure necessary for releasing the relevant surface area of the inner container from the outer container and/or vice versa can be significantly reduced in comparison to the same container having identical inner and outer containers, formed without such surface area having an increased surface roughness.

In advantageous embodiments of the present disclosure at least in a shoulder region of a container such surface area or region is provided having a surface roughness of at least about 0.1 Ra and/or about 0.1 Ra higher than that of the surface area of the other container in contact therewith. It has been found that especially in such shoulder area release of the walls of the inner and outer containers from each other, that is forcing them sufficiently apart in order to allow the pressure fluidum such as gas, especially air, or a liquid, such as for example water, such as cooled water, to pass into the space around the body forming region of the inner container requires relatively high pressures, which can significantly be reduced by increasing said surface roughness. Cooled water as pressure medium may have the advantage that it will add to cooling or at least keeping cooled the content of the container during use.

In advantageous embodiments of the present invention additional to providing such particles or as alternative thereto for increasing the surface roughness of at least part of a surface of a preform or container such part of a preform or container can be roughened differently, for example by chemically or mechanically working said surface area, for example by (chemical) etching, sand-, glass- or ice-blasting, sanding, grinding or the like, providing texture on said surface area. Alternatively the injection mould in which the relevant preform is to be injection moulded could be provided with a surface area having an increased surface roughness, such that preforms are obtained with such mould which result in a blow moulded container having the desired roughened surface portion with a surface roughness above 0.1 Ra, more specifically above 0.3 Ra, such as for example between 0.3 and 1 Ra, for example between 0.3 and 0.7 Ra. Obviously such embodiments can be combined with adding said particles to the plastic mass for forming the preform.

In a preform, especially an inner preform, or an inner container formed there from preferably the wall of at least a neck region and body forming portion thereof is substantially opaque or non-transparent, and preferably is silver coloured. In this disclosure the indication silver coloured has to be understood at least as meaning having an overall impression of a colour akin to silver, which may include for example the appearance of or provided by aluminum or alloys thereof, platinum, titanium, cold or warm grey or the like. Preferably the particles provide for at least partial reflection of light. Silver can for example be comparable to but is not limited to Pantone colour PMS420 to 431, 535 to 537, 5425, 5435, 5445, cool grey 3 to 9 or warm grey 3 to 9, or as provided by Holland Colours, The Netherlands, as Holcobatch silver.

In embodiments of the present invention the entire surface of a preform or container or at least of a body forming and shoulder forming region thereof can have substantially the same surface roughness of more than about 0.1 Ra, more particularly more than about 0.3 Ra in the blow moulded container. In alternative embodiments only part of said surface can have such surface roughness, the surface roughness of the further container being lower than 0.1 Ra.

In this disclosure surface roughness expressed in µm Ra and is to be understood at least as defined in ISO4287 or similar. Areas having an increased surface roughness, especially a surface roughness of more than 0.1 Ra preferably are provided such that the Ry and Rz are not too high, for example below 2, more preferably below 1. A surface roughness in this disclosure preferably means a texture of said surface area which is randomly or at least semi randomly defined, which texture can for example be comparable with sanding paper or orange skin.

It has been found that by providing the said surface area with an increased surface roughness, especially above about 0.1 Ra, more especially above about 0.3 Ra, even more specifically about 0.35 Ra or more, and/or by providing containers having facing surface areas having a surface roughness difference of at least about 0.1 Ra, more especially above about 0.3 Ra, even more specifically about 0.35 Ra or more, the use of a release agent between said surface areas or even between the inner and outer container is no longer necessary or can at least be limited in view of known preform assemblies and container blow moulded therefore, generally referred to as BIC or BIB containers. This can have economic advantages, since no or less release agent has to be applied, as well as technical and environmental advantages. An advantage can be that since no or less release agent is needed, the problem that over time the release agent will flow can be avoided. In the known art release agent is used covering about the entire contact surface between an inner and outer container, by applying the release agent between the inner and outer preforms. When these assembled preforms are stored, prior to use, that is prior to blow moulding, for example inline in a filling line, the release agent may flow, due to gravity, to the lowest point of the preform assembly, which could mean that the force necessary to separate the parts of the containers from which the release agent has flowed will again increase significantly. In a preform assembly according to the present invention only a limited supply of or even no release agent is necessary, whereas a roughened surface area may aid in keeping the release agent from flowing better than a smoother surface.

In this description preform set and preform assembly are used as interchangeable, unless indicated differently. In this description in a container blow moulded from a preform, preform assembly or preform set an inner layer is obtained, also referred to as inner container or bag, formed generally from the inner or first preform and an outer layer, also referred to as outer container, formed generally from the outer or second preform. As discussed "inner" and "outer" in this respect has to be understood as meaning that the "inner" layer of container is positioned at least for the largest part within the "outer" layer or container, whereas an interface or space is provided between said inner and outer layer or container, but they do not necessarily have to be the inner most and outer most layers or containers, as for example shown in FIG. 3. IN the further description an inner preform may also be referred to as first preform, an outer preform as second preform, unless specifically defined differently.

Figure 2:
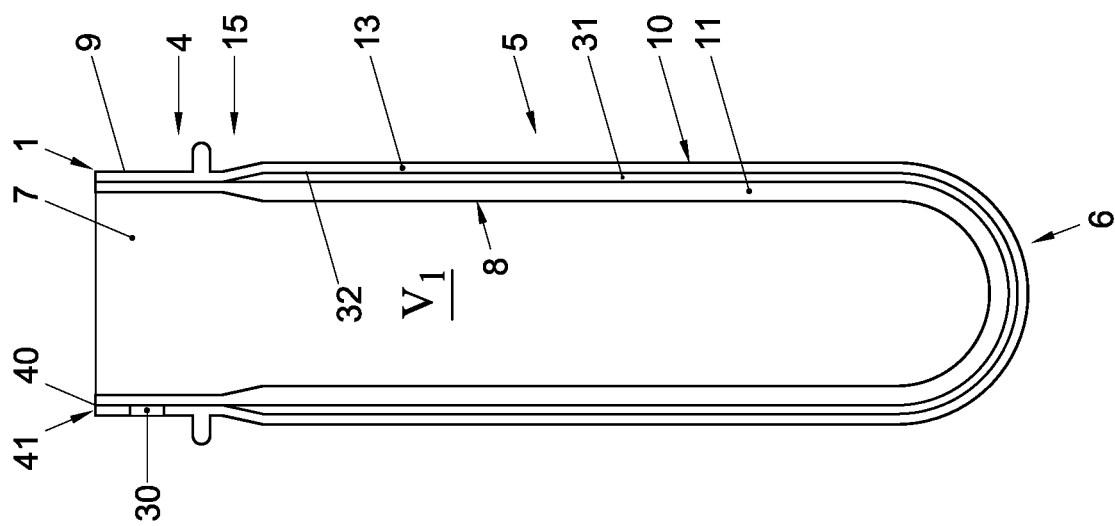
FIG. 2 schematically in cross section a preform assembly in a second embodiment.

In FIGS. 1-3 schematically a preform assembly 1 is shown, comprising a first preform 2, positioned inside a second preform 3. The first and second preforms 2, 3 can be injection moulded separately, in single or multi cavity moulds, where after the first preform 2 can be inserted into the second preform 3, by relative movement of the preforms 2, 3. Alternatively they could be made integrally, for example using over moulding techniques known in the art. In the embodiments shown the preform assembly has a neck 4 and a body 5 extending from the neck 4, closed at the end opposite the neck 4 by a bottom 6 as part of the body 5. In the embodiment shown the first preform 2 comprises a neck portion 7 and a body forming portion 8. The second preform also comprises a neck portion 9 and a body forming portion 10. In the position as shown in FIG. 1 the body forming portion 8 of the first preform 2 extends inside the body forming portion 10 of the second preform 3, whereas the neck portion 7 of the first preform 2 extends substantially within the neck portion 9 of the second preform 3. Obviously the inner preform 2 could also extend partly outside the outer preform 3.

The body forming portion 8 of the first preform 2 can have a wall 11, extending at least between the neck portion 7 and a bottom forming portion 12 of the first preform 2, which has a thickness $W_1$ of less than about 8 millimetres. The wall thickness $W_1$ of the wall 11 can be less than about 6 millimetres. The body forming portion 10 of the second preform 3 can have a wall 13, extending at least between the neck portion 9 and a bottom forming portion 14 of the second preform 3, which has a thickness $W_2$ of less than about 8 millimetres. The wall thickness $W_2$ of the wall 13 can be less than about 6 millimetres. The wall thickness $W_1$ of the first preform 2 can be smaller than the wall thickness $W_2$ of the second preform 3, or vice versa. In another embodiment the wall thicknesses $W_1$ and $W_2$ can be about the same. The wall thicknesses $W_{3,4}$ of the bottom forming portions 12, 14 of the first and second preforms 2, 3, can be smaller than the thicknesses $W_1$, $W_2$ of the walls 11, 13 connected thereto. In another embodiment the thicknesses can be similar or bigger. In embodiments for forming a BIC or BIB type container, in which the inner container can be compressed for dispensing the content by pressurising the space between the inner and outer container, as will be discussed hereafter, the inner preform 2 may, at least in the body forming portion, for example have a wall thickness W1 close to a minimum wall thickness obtainable by injection moulding of said preform 2, whereas the outer preform 3 may, at least in the body forming portion, have a wall thickness close to the maximum allowable wall thickness for injection moulding said preform without thermal crystallisation. The wall thickness W1 may be significantly smaller than the second wall thickness W2, for example half or less thereof.

Figure 4:
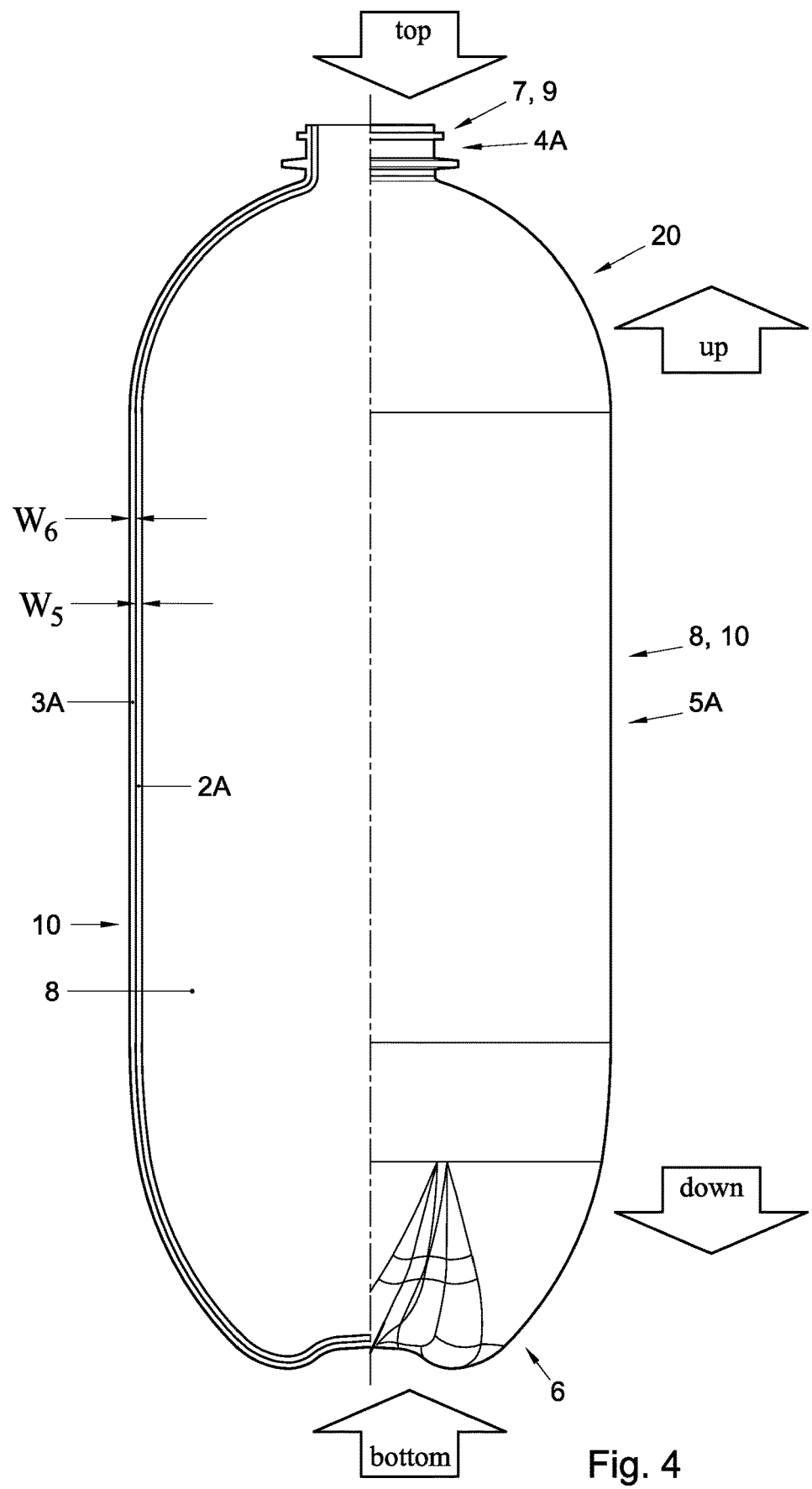
FIG. 4 schematically and partially in cross section a container, in a first embodiment.

When a container 20 is blow moulded from the preform assembly 1 of for example FIG. 1 or 2 the container 20 will, as shown in FIG. 4, have an inner layer 2A, formed from the first preform 2, and an outer layer 3A, formed from the second preform 3. The layers 2A, 3A shall, in the body portion 5A of the container 20, have thicknesses $W_5$, $W_6$ respectively, defined mainly by the original wall thicknesses $W_1$, $W_2$ of the preforms 2, 3 respectively, and the extent to which the preforms are stretched. In an advantageous embodiment during blow moulding the container 20 the body forming portion 8 of the first preform 2 will be stretched further, that is to a higher extend than the body portion 10 of the second preform 3. In an embodiment this is done such that the inner layer 2A shall be stronger but more brittle than the second, outer layer 3A, which will be less stiff but more ductile. In another embodiment the preforms 2, 3 can be substantially evenly stretched, resulting in similar material properties. In another embodiment the preforms can be heated to and/or blow molded at different temperatures, influencing crystallization. Combinations of these embodiments are also possible.

For blow moulding container of a size above 3 litres, especially above 5 litres, such as containers for carbonated beverages having a volume of about 10 litres or more, using a single preform, a preform normally will have a wall thickness of more than about 6 to 8 mm. By reducing the wall thickness $W_1$, $W_2$ of the preforms 2, 3, especially below about 8 mm, more preferably close to or below 6 mm, the cycle time for injection moulding the preforms will be reduced significantly over single preforms for blow moulding the same sized and dimensioned containers. Moreover, better mechanical properties can be obtained, whereas for example permeability for gasses such as $O_2$ and $CO_2$ can be optimized. As indicated additives can be added to the different preforms, such that they do not interfere with each other or with the materials used for the preforms, which materials may be different or the same for the preforms 2, 3.

It has been recognised here that by injection moulding the preforms from a plastic prone to crystallisation, such as PET, by reducing the wall thicknesses of the preforms 2, 3 to around or below 8 mm, preferably to around or below 6 mm, at least for the parts to be stretched later on, crystallisation of the plastic material in the preform can easily be prevented substantially or preferably entirely, even with standard PET, whereas the preform can be stretched to such extend that crystallisation in the container wall can be obtained. This can obviate the need for using more expensive and more difficult to handle grades of plastic. Moreover, using standard grades of plastics such as but not limited to PET can have the advantage that the plastic, especially a container blow moulded therefore will have better mechanical properties and especially will be less prone to creep. By having to use no or substantially no crystallisation preventing additives in the plastic, such as glycol or other such additives known in the art, the preform can be stretch blow moulded into a relatively strong and/or stiff and/or rigid container, because said additives will not be present in the container. An optimal stretch ratio can be obtained, resulting in a light and strong container. For as far as the container is blow moulded from one preform this can have specific mechanical properties, whereas the part of the container blow moulded out of another of the preforms in the preform assembly, the latter can be made for example more pliable, more flexible, more shock absorbing or otherwise have different mechanical and/or chemical properties.

By using different preforms assembled and stretch blow moulded into one container, the preforms can be optimised, for example for heat transferring and heat absorbing properties. By amending for example the colouring of one of the preforms compared to the or each other preforms, the heating of the preforms can be optimized. For example an inner preform can be made darker than the outer preform, resulting in the advantage that when the preforms are heated together from an outside of the preforms, the heat will be better absorbed by the inner preform than by the outer preform. Since the inner preform will be further away from the heating source than the outer preform, this will lead to a further optimized heating, especially a more even heating of the preforms. Alternatively or next to the colour differences between the preforms, the adjacent surfaces of the preforms can be optimized, for example by amending the roughness of the surfaces, to influence heat transfer from the outer preform to the inner preform or vice versa by amending the interface between the preforms. Obviously since the neck portions of the preforms will substantially not be deformed during blow moulding, the above is especially relevant for the parts of the preform(s) that will be heated and stretched.

In an embodiment the outer preform 3 can be made of a highly impact resistant polymer, stretch blow moldable material, preferably a material having an impact resistance of more than 250 according to the standard Notched Izod Impact Test. Such material can for example be but is not limited to modified Nylon, toughened Nylon 6,6, blends of polycarbonate, impact modified PBT and impact modified PBT/PET. Such impact resistant materials will provide an outer container which can prevent to a high degree the container 20 from exploding uncontrollably when for example pierced. In another embodiment at least one of the first and second preform or container can be provided with an integral layer of such high impact material.

In this description a wall thickness W has to be understood as an average thickness of a wall or relevant part thereof. Preferably the thickness of the walls of body forming portions of preforms 2, 3, except possibly for the bottom forming portions and possibly an area 15 near the transition of the neck portion to the body forming portion, is substantially constant or has a substantially smooth course.

As is shown in more detail in FIG. 1A, the neck portion 7 of the first preform 2 can have an outward reaching flange 22 near or at a free edge 23 thereof, whereas the neck portion 9 of the second preform 3 can have a first portion 24 near the free edge 25 thereof and a second portion 26 between said first portion 24 and the body forming portion 10. The first portion 24 is slightly wider than the second portion 26, such that the flange 22 can abut the transition 27 between the first and second portions 24, 26, and cannot pass the second portion 26. Thus the first preform 2 is again prevented from being inserted further into the second preform 3, whereas when a container 20 is blown there from the second portion 26 of the second preform 3 will extend and be enclosed between the flange 22 and the body forming portion 8 of the inner layer 2A of the wall, such that the inner layer 2A is kept in position relative to the outer layer 3A mechanically, even if no adherence or other connecting means between said layers 2A, 3A is present. Obviously other means can be provided for locking the first preform relative to the second preform.

In an embodiment the neck portion 9 of the second preform 3 can have at least one and for example two flanges extending outward. In an embodiment two flanges 28, 29 can be provided, extending substantially parallel to each other. In an embodiment one flange 28 can extend at or near a level of the transition 27 between the first and second portion 24, 26, such that this flange can aid to shape retaining of the relevant part of the neck 4, thus further preventing the inner layer or preform 2 to come loose from the outer layer or preform 3. In an embodiment another flange 29 can be provided between the first flange 28 and the body 5 and can be used for example but not limited to for engagement during transfer of the preform 3 or preform assembly, during transport of the assembly, during blow moulding, during filling and for attachment of a cap, lid, valve assembly, dispensing device or other means. This flange can also aid in shape retention of the neck 4. In an embodiment the flange 29 can extend further outward than the first flange 28. In embodiments only one flange can be provided.

A preform assembly 1 can be made of PET or PET blends. In an embodiment the first preform 2 can be made of virgin plastic material or at least a food or beverage grade plastic material. In an embodiment the second preform 3 can be made of recycled plastic material. In an embodiment an additive can be provided in the plastic material for influencing, especially reducing migration of gas through the wall of the container, such as but not limited to for example an $O_2$ or $CO_2$ barrier. In an embodiment one of the first and second preforms 2, 3 can comprise a barrier material scavenger, for gas migrating into or through the plastic material. The barrier material can be or contain a scavenger, such as an $O_2$ scavenger. In an alternative embodiment the barrier material or scavenger can be for a different gas, such as but not limited to $CO_2$. A gas migration limiting or preventing additive and/or a scavenger can have the benefit that for example oxidation of the content of a container 20 blown from the preform assembly 1 can be prevented or at least limited. In an embodiment one of the first and second preforms 2, 3 can comprise a colorant, such as but not limited to green, brown, blue, yellow or red. Colouring of the preform 2, 3 and thus of a container 20 to be formed therewith can have the advantage of shielding contents of the container and/or the container itself against deterioration or at least influence of the content by for example radiation. In an embodiment the first preform 2 can comprise the gas migration limiting or preventing additive and/or the scavenger, whereas the gas migration limiting or preventing additive and/or the scavenger and the colorant can provided in the same preform or in different preforms. Especially in BIC or BIB type containers it is preferably that most, if not all of the additives and barrier elements are provided in and/or on the inner preform. An advantage of adding a gas migration limiting or preventing additive and/or a scavenger to one of the preforms only can be that less of the additive and/or scavenger is necessary in the preform assembly 1, reducing the cost of the relatively expensive additives and/or scavengers. Preferably at least about 3% in weight of scavenger is added to the plastics material. Such scavenger can for example be an oxygen scavenger or a $CO_2$ scavenger. Obviously other materials or blends can be used, such as but not limited to PVC, PP or PAN.

In an embodiment the first preform 2 and/or the second preform 3 can be provided with at least one and preferably several openings 30 in the neck forming portion, extending there through. The opening or openings 30 can be provided below a free edge 23 of the first preform 2. In an embodiment having a first flange 28 the or each opening 30 can be provided at a level at or just below the first flange. In an embodiment having a transition 27, the or each opening can be provided just below said transition 27. In an embodiment having at least two flanges 28, 29, the or each opening 30 can be provided at a level between the first and second flange 28, 29. Openings 30 can be provided at different levels.

In the embodiments shown the or each opening 30 opens at one side into an interior V1 of the preform assembly 1 and thus into an interior space V of a bottle 20 blown there from. In embodiments in which the or each opening 30 is provided in the outer preform 3, such as for example shown in FIGS. 9-11, or between the neck regions of the inner and outer preforms 2, 3 or containers 2A, 3A, for example in axial direction parallel to the axis L, the opening 30 will open into the environment or at least in a direction away from the inner volume V, V1. At the opposite side the or each opening 30 can open into a space 31 between the neck forming portion 7 of the first preform 2 and the neck forming portion 9 of the second preform 3. The space 31 can be provided with spacers 32, such as ribs, notches or other elements extending between part of the neck forming portions 7, 9 below the free edge 23. These spacers can have the advantage that they keep at least part of the outside of the neck portion 7 of the first preform spaced from at least part of the second preform 3, at least the inner surface thereof. In a preferred embodiment the spacers 32 can extend into a shoulder forming portion 50 of the container 20 or preform assembly 1. This results in space between an inner and outer wall in the shoulder portion of the container blow moulded from the preform assembly 1. This can have the advantage that a pressure fluid, especially a pressure gas can be brought easier between an inner and outer wall portion of the body of the container 20, which can result in a more even pressure build up, advantageous to a homogenous dispensing pattern of the beverage from the container 20. The space 31 can extend further between the body forming portions of the inner and outer preforms 2, 3 or containers 2A, 3A.

A lid 33 can be provided in and/or on the container 20, as shown schematically in for example FIGS. 5,7, 8 and 10. The lid 33 can be provided in any suitable manner, such as for example but not limited to welding, such as but not limited to ultrasonic welding, spin welding, clinching, press fit, screw threads, bayonet closure, gluing or other suitable means. The lid 33 closes off the internal volume of the container 20. A dispense opening 34 is provided in the lid 33. In an embodiment a valve 35 can be provided in the dispense opening, which can be a known beverage valve such as but not limited to a beer valve. In the embodiment shown the valve 35 is provided in and over the opening 34 by a clinch connection 42, wherein the opening 34 is larger than the clinch plate 42A of the clinch connection. This can provide for the possibility of providing the lid 33 prior to blow moulding the preforms into a container, whereas the clinch connection can be made after filling the container through the opening 34. In another embodiment the valve 35 can be provided in a different manner, for example by welding, screwing, pressfit, and/or by providing a plastic valve assembly, which can for example be partly or entirely made integrally with the lid 33. Preferably with a preform assembly 1 according to the description the preform assemblies are blow moulded in line with a filling and closure apparatus, reducing transport and storage volumes considerably. In an embodiment the valve 35 can be a spray can type valve, for example a male or female type of spray can type valve. Such valves are well known in the art. Examples of such valves are described for beverage containers in NL1012802, 1012921 and NL1012922, herein incorporated by reference. Alternatively the valve and in general the upper end of the container, including a closure or mounting ring can be as described in non-pre-published application NL2009731 or NL2009732. In embodiments a pressure regulating device, for example as described in the above referenced and incorporated patents, can be provided inside the container, especially within the beverage or between an inner and outer wall part of the container, for maintaining an internal pressure in the container. When using the container for a carbonated beverage the internal pressure is then preferably maintained at an equilibrium pressure for $CO_2$ in the beverage. In another embodiment a spray can type valve can be used suitable for both introducing a gas into the container and dispensing a beverage from the container. Such valve is for example known from WO 2008/048098.

When for example a compressor or pump is provided for pressurising the container 20, for example by pressing a fluid into the inner volume V of the container or more preferably into the space 31 between the walls 2A, 3A of the container 20, it may be preferred that the same compressor or pump can be used to pump, especially, such the fluid from the container 20, preferably such that the container collapses at least to some extent, especially such that the overall volume of the container is reduced significantly. This can for example be achieved by a compressor or pump which is reversible.

When one or more openings 30 are provided in the neck portion 7, 9 as discussed here above, for example on an inner or outer side thereof, a pressure fluid supply opening 36 can be provided in the lid, in fluid communication with at least one of the opening(s) 30. In the embodiment as shown schematically in FIG. 8 a circumferential groove 38 is provided in the lid, open to the inner surface of the neck portion 7, to which groove 38 the supply opening opens. The groove 38 is sealed against the inner side 37 of the neck portion 7, 9 such that a pressure fluid cannot flow from the groove 38 into the internal volume V of the container 20. Pressure fluid such as gas, for example air or (cooled) water, supplied through the opening 37 thus flows through the groove 38 into at least one of the openings 30 and into the space 31 or at least between the neck portions 7, 9 of the preforms 2, 3. From there the pressure fluid can then flow between the layers of the wall of the body of the container, pressing the inner layer 2A away from the outer layer 3A in the body 5A of the container 20. This will pressurise the inner layer and thus the beverage contained therein, forcing the beverage through the dispense opening 34 in the lid 33.

It has been recognised that a substantially spherical bottom forming portion of the inner and outer containers may require less pressure for releasing the inner container or layer from the outer than a pettaloid shaped bottom forming portion of the container.

In a further embodiment, not shown, a tapping rod or tap spear can be inserted into the opening. Such tap spear or tapping rod is well known in the art, for example from beer barrels. One type is a tap spear having a Sankey two or three lug valve assembly which can be mounted in or on the neck 4 of the container 20. Another well known type of tap spear has a flat head valve assembly, which can be mounted in and/or on the neck of the container. Such tapping rod or tap spear has a gas supply valve and a beverage dispensing valve, which can be operated by a tapping head. In an embodiment the gas valve can open into the inner volume V of the container, especially within the inner layer 2A, for pressurising directly the beverage therein. In another embodiment the gas valve can open into one or more opening 30, for pressurising the inner layer 2A from the space 31 between the inner and outer layer 2A, 3A. Thus the beverage can be pressurised indirectly, without the pressure gas coming into contact with the beverage. Instead of a pressure gas a pressure fluid such as water can be used in that case. In an embodiment as a pressure gas air is used, fed into said space 31. In such embodiment preferably an $O_2$ scavenger is provided in the plastic material of the inner layer 2A and/or in the space 31, for preventing or at least reducing the risk of oxidation of the beverage by $O_2$ migrating through the inner layer 2A. In an alternative embodiment instead of or next to a scavenger a plastic material can be used for the inner layer having a high $O_2$ barrier and/or a protective film or layer of such material can be provided on the surface of the first preform 2 and/or in the space 31.

Figure 9:
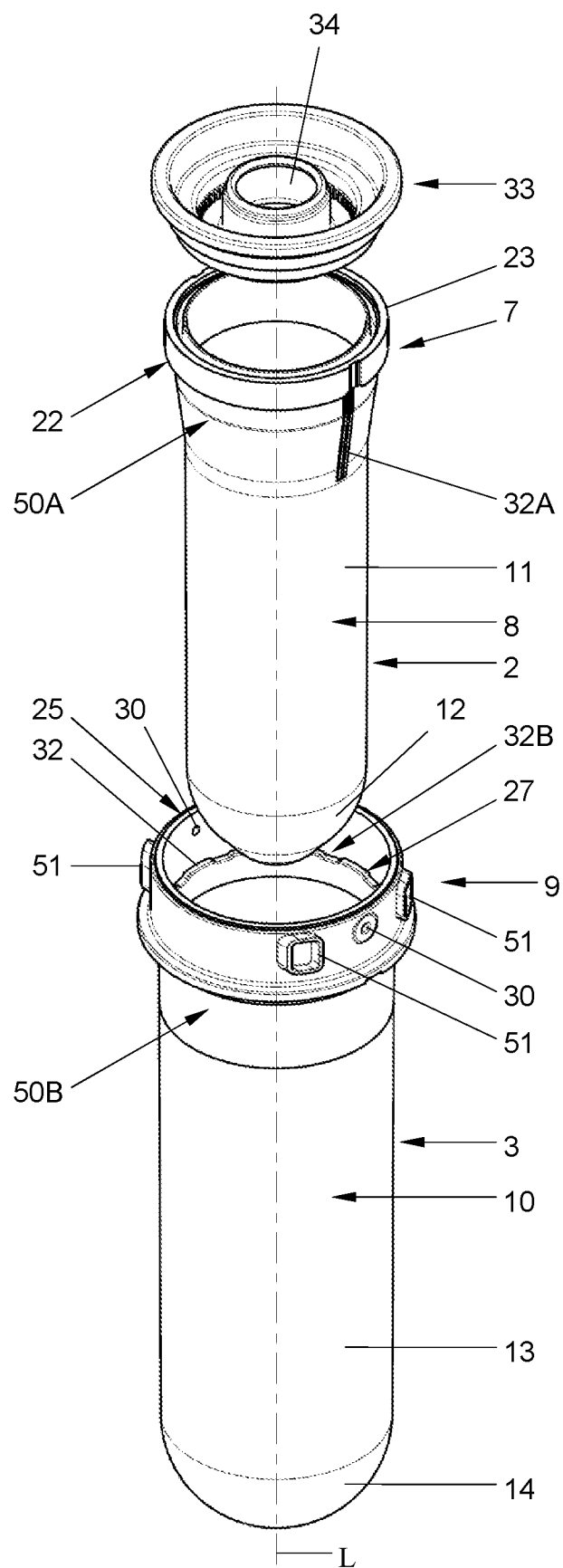
FIG. 9 in exploded view an alternative embodiment of a preform assembly with a closure ring.
Figure 10A:
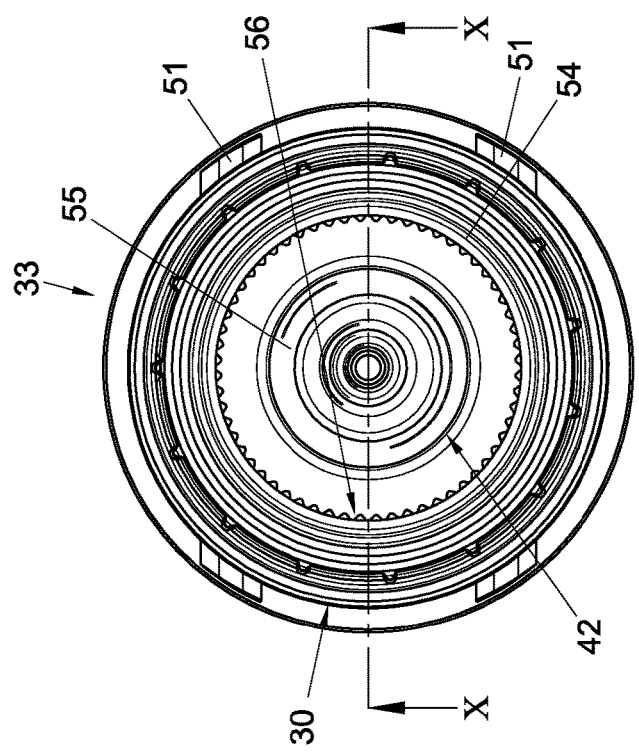
FIG. 10A in top view an upper part of a preform set or a container blow moulded from a preform set, especially one according to FIG. 9.

FIG. 9 shows, in exploded view, a preform set 1, comprising the first or inner preform 2 and the second or outer preform 3, and a lid or closure ring 33, also referred to as mounting ring 33, which can be mounted on the free edges 23 and 25 of the inner and outer preforms 2, 3 or the inner and outer container 2A, 3A, for example by welding, such as but not limited to spin welding or ultrasonic welding, closing off the space 32 between the inner and outer preform 2, 3 and the inner and outer container 2A, 3A. FIGS. 10A and B show in top view and cross sectional view respectively an upper part of a container 20 formed from such preform set 1. Such set and a container formed there from, as well as connecting devices and tapping assemblies suitable to be used therewith are more extensively discussed in the co-pending applications NL2009234, NL2009237, NL2009235, NL2009236, NL2009732 and NL2009731 which are at least for these aspects considered to have been incorporated herein by reference.

As can be seen in FIG. 9 in the shoulder forming portion 50A and in the neck portion 7 of the inner container 2 spacer elements 32 are provided, which in this embodiment comprise at least one and preferably a plurality of channels 32A extending in the outward facing surface of the preform 2, from at or near the free edge 23 to at least near or passed a lower edge of the shoulder forming portion 50A. The second preform 3 comprises the shoulder or edge 27 on which the edge or flange 22 of the neck forming portion 7 of the inner preform 2 can rest. Spacer elements 32 are provided in said edge 27 by for example cut outs 32. The spacer elements 32B provide for channels or the like spaces through which in a container formed from the set 1 a pressure fluid, such as gas, for example air can be fed from the at least one opening 30, which in this embodiment is provided in neck region 9 the outer preform 3, into the space 31 between the containers 2A, 3A, especially between the body portions 5A and 5B thereof, passing through the shoulder forming portion 5. When blow moulding the container 20 from the preform set 1 the channel or channels 32A may become slightly flattened and thus shallower, though wider, but will still remain sufficiently open to allow pressurised fluid to pass. Alternatively and/or additionally such channels could be provided at an inner surface part of the outer container.

Figure 10B:
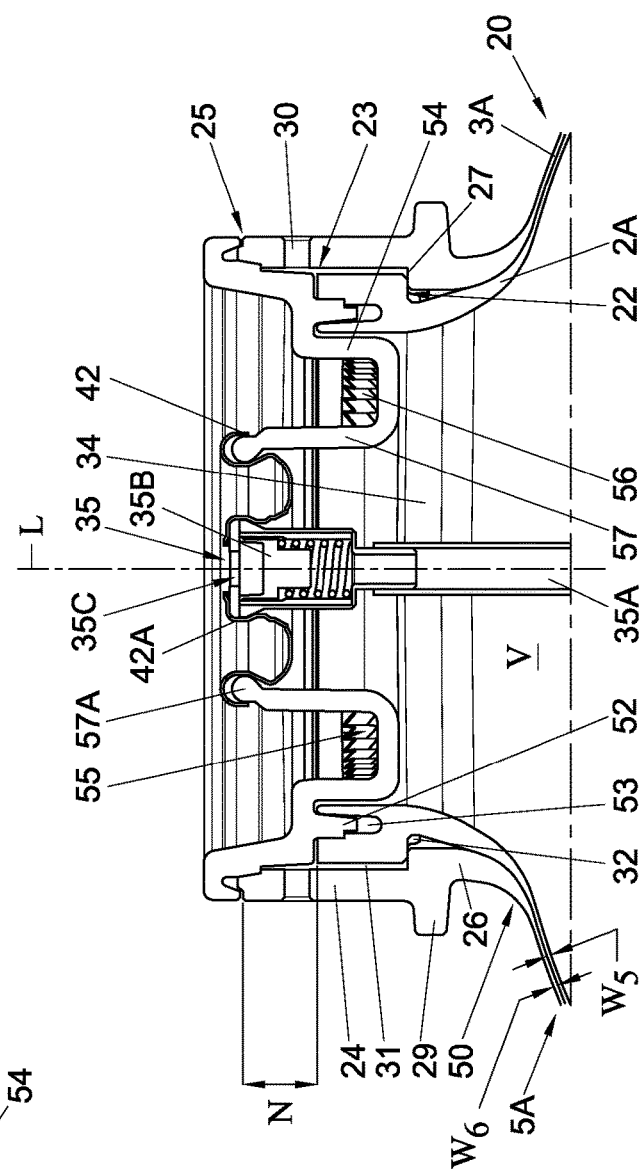
FIG. 10B in cross section along the line X-X in FIG. 10A an upper part of a container.
Figure 11A:
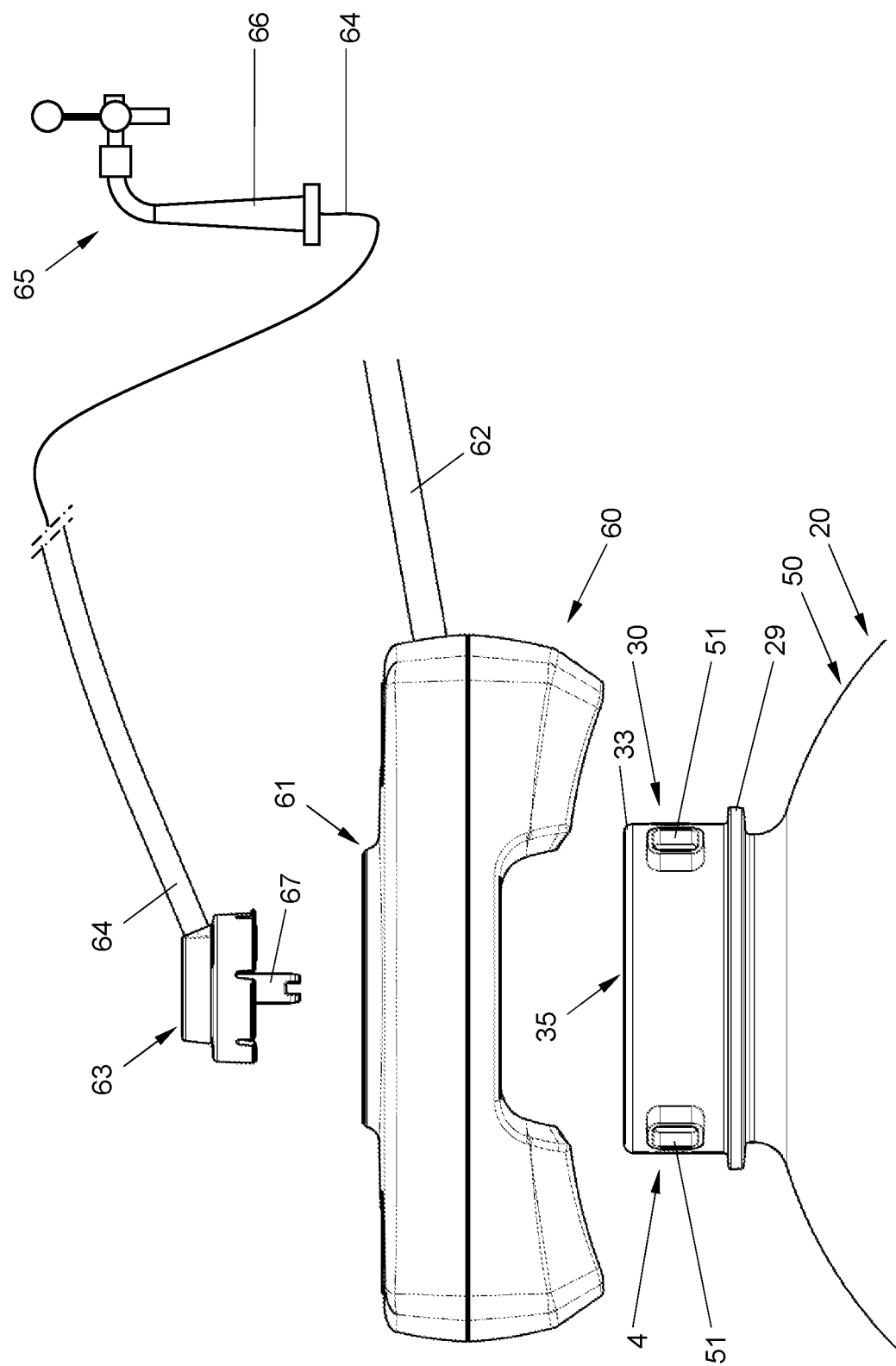
FIGS. 11A and B schematically an upper part of a container with a tapping assembly, in two alternative settings.

As can be seen in FIGS. 9 and 10A coupling elements 51 can be provided, for example in the neck region 4 of the container 20, for coupling a connecting device to the container, as for example shown in FIGS. 11A and B. In this embodiment the coupling elements are provided for as notches extending outward from the neck portion 9 of the outer container 3A and of the outer preform 3, in this embodiment on either side of the or each opening 30, relatively close to said opening 30. In the embodiment shown especially in FIG. 10B, the ring or lid 33 has a skirt 52 extending into a groove 53 in the upper edge 23 of the inner preform 2 and container 2A, whereas a wall 54 of a ring shaped recess 55 of the ring or lid 33 extends alongside an inner surface of the upper edge 23. Thus a labyrinth is formed at the upper ends 23, 25 and the ring or lid 33, preventing debris from entering into the space 31, especially during welding, such as spin welding. Within the recess 55 teeth 56 or the like engagement means can be provided for engaging a tool for holding the ring or lid 33, for example during spin welding. Opposite the wall 54 a further wall 57 of the recess 55 is provided, which can be substantially cylindrical and defines an opening 34A which is at the upper end closed by the clinch plate 42A clinched to the upper edge 57A of said wall 57. The opening 34A preferably has a cross section perpendicular to the axis L which is sufficiently large and appropriately formed to allow at least one of and preferably both of a blow moulding tool, especially a stretch rod through to be inserted into the volume V1, and at the same time allow pressure relief by allowing gas to pass along said tool into the volume of the bottle being formed and/or vice versa, and to allow a filling tube of a filling station to be entered into the volume V of the container 20 after blow moulding, for filling the container 20. The ring or lid 33 can then be mounted to the preforms and/or containers, before filling of the container or even before blow moulding the container 20. Preferred cross sections of the opening 34A have been discussed earlier in this disclosure, for the same or similar purposes. In the embodiment shown in FIGS. 10A and B a valve 35 is mounted by the clinch plate 42A, which valve is provided with a riser pipe 35A extending into the inner volume V of the container, for example at a position close to a bottom 5A of the inner container. In alternative embodiments a valve can be used without such riser pipe, especially if the container 20 or at least the inner container 2A is compressible for dispensing the content, especially a carbonated beverage such as beer.

In the embodiment shown in FIG. 10B the opening or openings 30 is or are, or at least can be positioned at a level above the upper edge 23 of the inner container 2A, such that when viewing through the at least one opening 30 part of the ring or lid 33 will be seen. To this end the upper edge 23 of the inner container 2A lies a distance N below the upper edge 25 of the outer container 3A. Obviously other configurations are possible as well. In the embodiment shown the valve 35 is a female type valve, meaning that the valve body 35B thereof will have to be engaged through a dispense opening 35C thereof, which lies below the top side of the ring or lid 33 and is thus well protected. Other types of valves 35 are also possible, such as but not limited to male type valves, having an extension of or on the valve body extending through the opening 35C for engagement, wherein both can be a tilting type valve.

FIG. 11A shows schematically an upper end of a container 20, showing part of a shoulder or shoulder forming portion 50 and a neck 4 with two of the connecting elements 51. Above the container 20 a connecting device 60 is shown, having a central opening 61, schematically shown by dotted lines, with which the connecting device can be placed over the neck 4. Within the opening 61 counter connecting elements (not shown) are provided for cooperating with the connecting elements 51 for securely mounting the connecting device 60 onto the neck 4. A gas supply line 62 is connected to the connecting device 60, for supplying gas under pressure, such as but not limited to air, to at least one of the openings 30 in the container 20 and thus into the space 31 for pressurising the inner container 2A.

Above the connecting device 60 a connector 63 is shown, also referred to as a dispense adapter or valve adapter, connected to or forming part of a tapping line 64, preferably an at least partly flexible tapping line 64. The tapping line 64 can be connected to or be part of a tapping device 65, comprising at least a tap 66. As a tap any fixed or mobile tap can be used, depending on for example the tapping line used. In embodiments the tapping line can be a replaceable tapping line, especially a disposable tapping line, as for example used in Heineken's David® system, as for example disclosed in EP1289874 or US2004226967, in which case a tap can be used to which the tapping line can be releasably coupled, for example by an in-line valve or by forming a valve assembly of the hose valve type, or by a quick coupling type coupling. In other embodiments the tapping line used can be a fixed tapping line of a beverage dispense system. Both types of systems are well known in the art and shall not be further discussed.

With the connecting device 60 connected to the container 20 and the connector 63 mounted onto the container 20, for example onto an outer edge of the clinch plate 42A, the valve 35 is opened by the hollow extension 67 of the connector 63, thus providing for a fluid connection between the inner volume V and the tap 66. Gas can be supplied under pressure through the opening or openings 30, pressurizing the beverage to be dispensed.

Figure 11B:
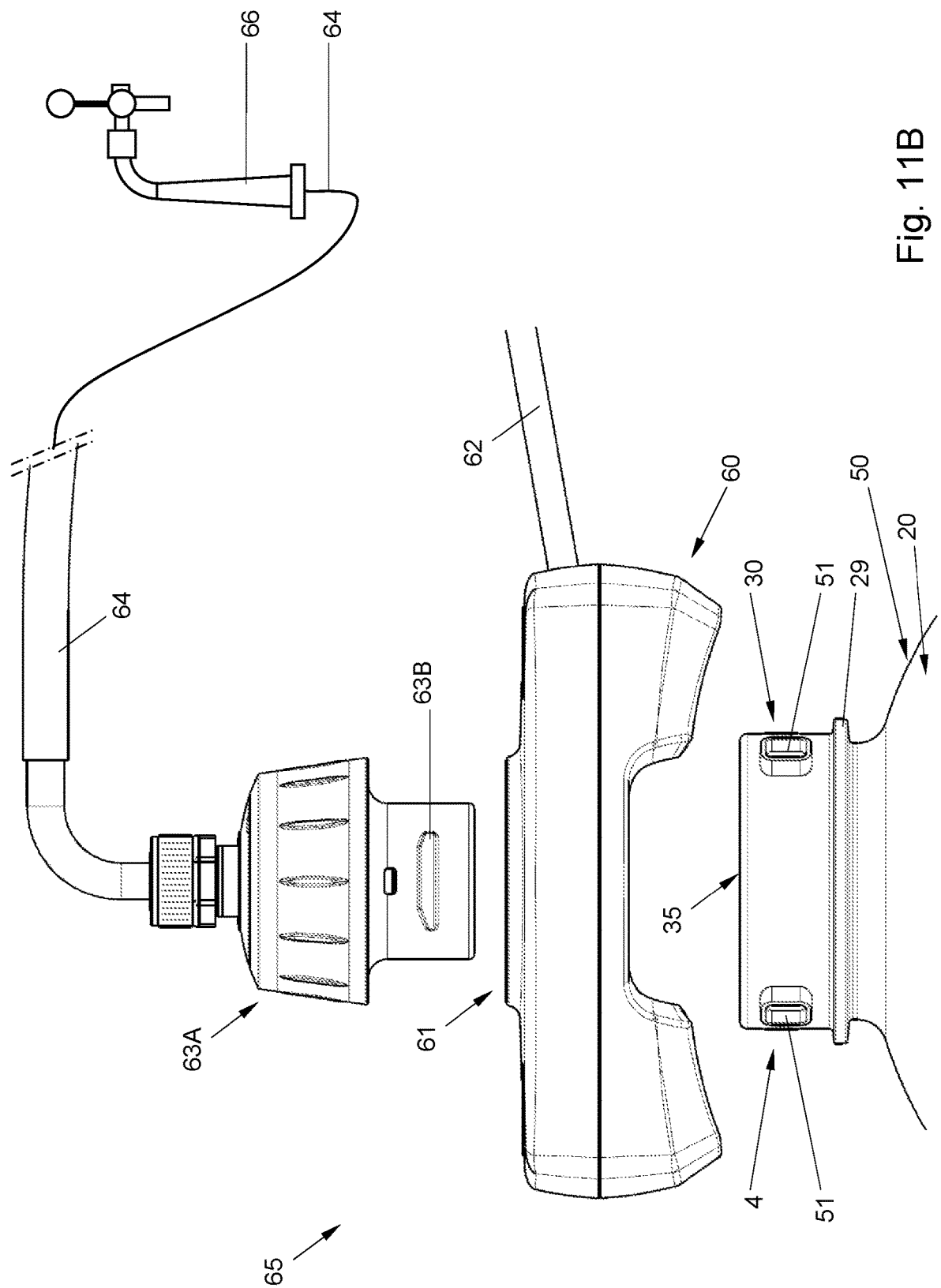

FIG. 11B shows an alternative embodiment, in which the connector 63 is replaced by a connector 63A which can be connected to the connecting device 60, for example by a bayonet coupling including coupling elements 63B on the connector 63A and counter connecting elements (not shown) in the opening 61.

Such tapping systems and connectors 60 to be used there with are for example more extensively discussed non-pre-published applications NL2009234, NL2009237 and NL2009235, as referenced before. Tapping line has to be understood in the broadest sense and can be for example a flexible or rigid tapping line, a hose, pipe, part of a Python type tapping line and the like, and can be provided with or connected to cooling means, such as an in line cooler or feed through cooler or can be cooled differently, such as in a Python type tapping line.

It will be clear that a source for pressurized fluid, such as gas or liquid, can be connected to the at least one opening 30 and/or to the space 31 in a different manner, for example directly.

Figure 5:
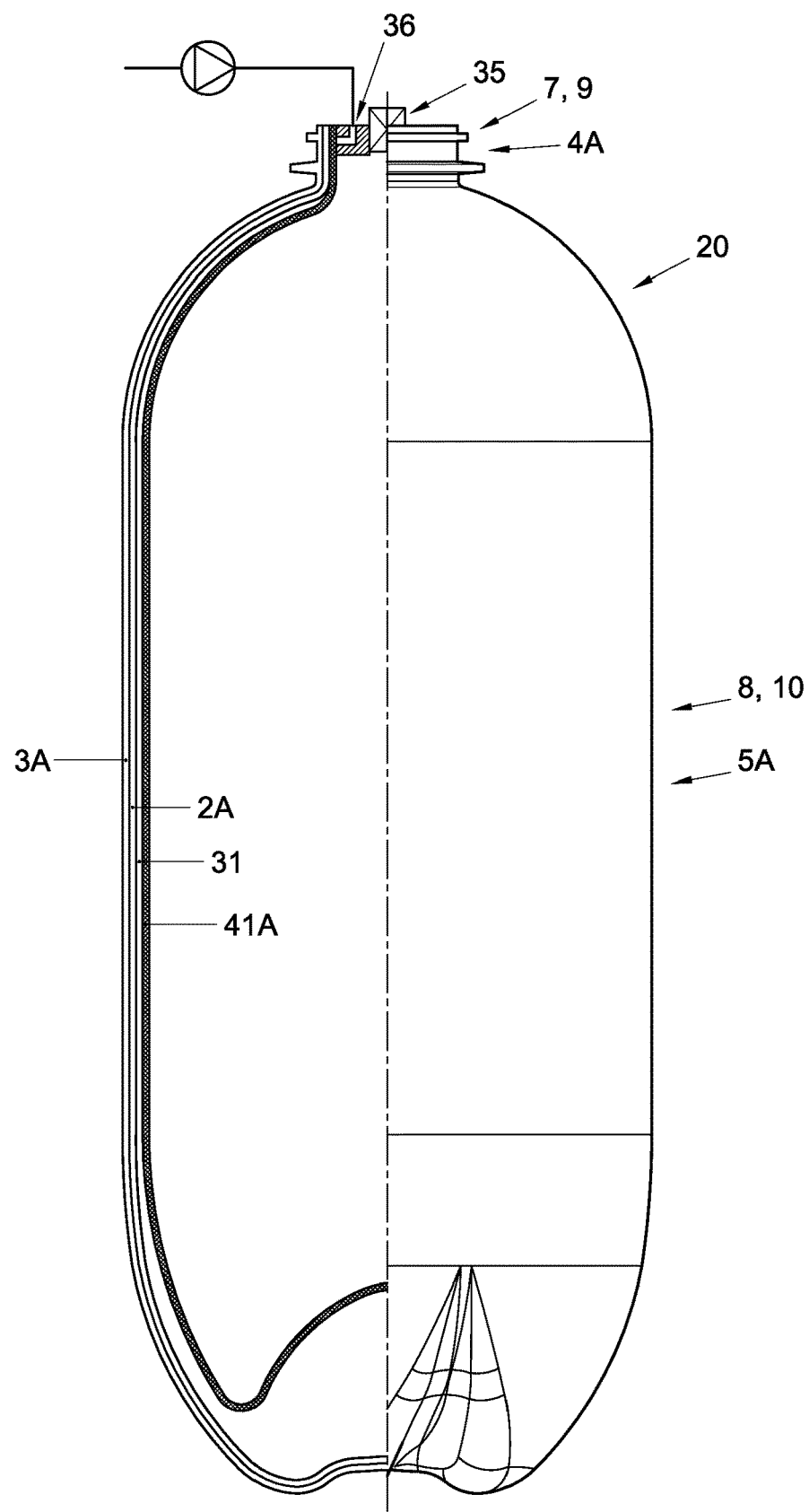
FIG. 5 schematically and partially in cross section a container, in a second embodiment.

A preform assembly 1 of any one of the embodiments shown can be shaped and dimensioned for blow moulding a plastic container 20, as schematically shown in FIG. 4 or 5, such as for example a BIC or BIB type container, having an internal volume V of more than three litres, especially more than 5 litres, for example an internal volume between 8 and 40 litres. Examples can be containers 20 having substantially a bottle or barrel shape with an internal volume of about 10, 20 or 30 litres, such as for example about 17 to 20 litres. A preform assembly preferably has a neck area having an internal opening 21 with a cross sectional dimension D of about 25 mm or more, preferably about 49 mm or more, if it is substantially circular, or an equivalent cross sectional area of about 490 mm$^2$ or more, preferably about 1180 mm$^2$ or more. In an embodiment the cross sectional dimension D can be about 49.2 mm. A cross sectional dimension D has to be understood as measured perpendicular to a longitudinal axis L of the preform, measured near a free edge 22, 25 of the relevant neck portion 7 or 9, or the neck 4. In a preferred embodiment the opening 21 can have a substantially circular cross section perpendicular to said longitudinal axis, which can have said cross sectional dimension, defined by the diameter. The cross sectional dimension can decrease slightly in the direction of the body forming portion 4. The wall of the first preform 2 can for example have a cylindrical inner surface with a diameter $D_w$ at the side of the body 5 of some millimetres less than the said cross sectional dimension D. The diameter $D_w$ can for example be between 0 and 5% less. In an embodiment the cross sectional dimension of the opening 21 can be about 49 mm and the diameter $D_w$ at the body forming portion of the first preform 2 can be about 48 mm. Obviously other sizes, shapes and dimensions are possible. A relatively large cross section of the neck can have the advantage of a preferable stretch ratio of the body for relatively large volume containers, such as having an inner volume V of about 10 litres or more. A relatively large neck also can provide space for a standard tapping rod or at least for a tapping rod or valve assembly allowing connection of a standard tapping head such as for a Sankey two or three lug or flat head tapping head.

By way of example, for a container 20 having an internal volume V the first and second preforms 2, 3 and containers blow moulded there from can have dimensions as shown in the table 1 below, for crystallizing plastic, such as especially PET, more especially standard PET.

TABLE 1

| | volume | | |
|---|---|---|---|
| | 10 L | 20 L | 30 L |
| finish diameter D [mm] | 54 | 54 | 54 |
| midwall diameter preform [mm] | 56.1 | 56.1 | 63.4 |
| bottle diameter [mm] | 234.5 | 234.2 | 269 |
| preform length [mm] | 113 | 208 | 239 |
| bottle height [mm] | 282.5 | 520.8 | 593.2 |

| | range | | target | range | | target | range | | target |
|---|---|---|---|---|---|---|---|---|---|
| planar stretch ratio [1] | 9.00 | 12.00 | 10.45 | 9.00 | 12.00 | 10.45 | 9.00 | 12.00 | 10.53 |
| axial stretch ratio [2] | 2.20 | 2.80 | 2.50 | 2.20 | 2.80 | 2.50 | 2.20 | 2.80 | 2.48 |
| hoop stretch ratio | 3.21 | 5.45 | 4.18 | 3.21 | 5.45 | 4.17 | 3.21 | 5.45 | 4.24 |

Figure 6:
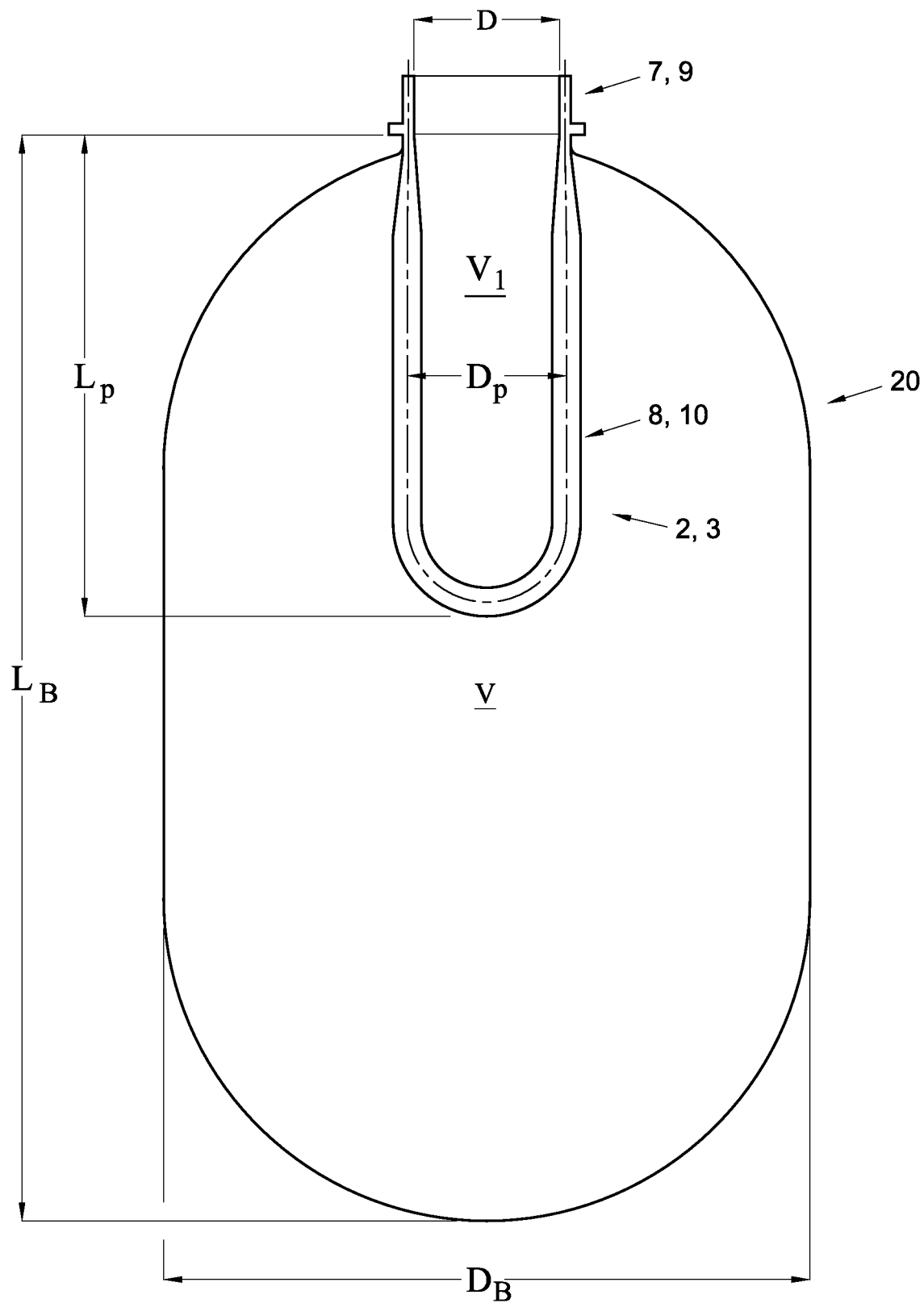
FIG. 6 schematically preform assembly and container.
Figure 7:
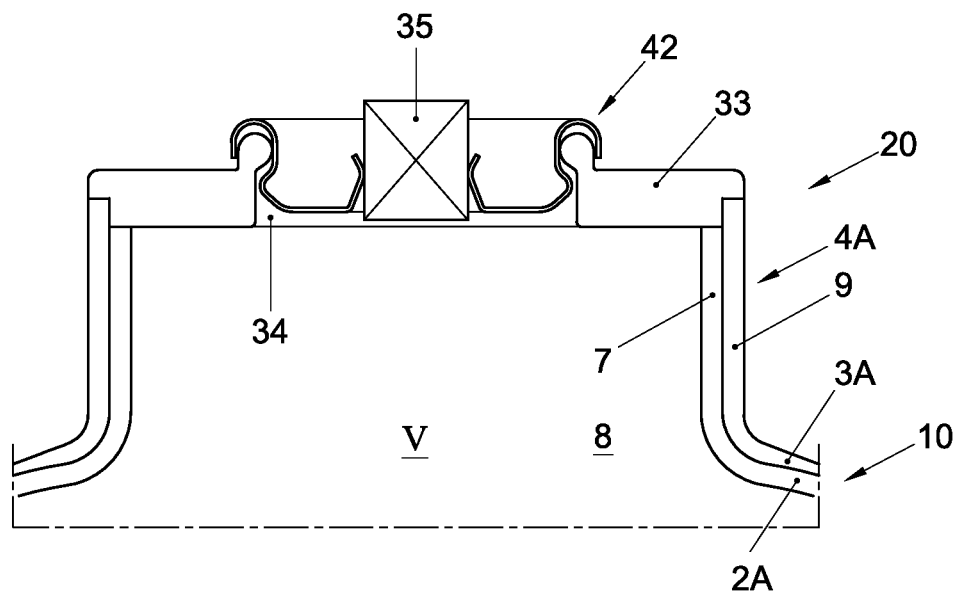
FIG. 7 schematically a neck portion of a container with a closure, in a first embodiment.

Wherein:
axial stretch ratio=bottle height $L_B$/preform length $L_P$
hoop stretch ratio=bottle diameter $D_B$/midwall diameter $D_P$
planar stretch ratio=axial stretch ratio*hoop stretch ratio
Volume=container inner volume V
Finish diameter=inner diameter D of the neck portion
Mid wall diameter=diameter of the body of the preform assembly measured over the middle of the thickness of the relevant wall.
Preform length=length Lp of the preform which is substantially stretch blow moulded, preferably measured from directly below a flange closest to the body to an apex of the bottom forming portion of the preform assembly.
Bottle diameter=average diameter of the body between a shoulder and a bottom
Bottle height=length Lb of the container which is substantially stretch blow moulded, preferably measured from directly below a flange closest to the body to an apex of the bottom.
All as for example shown in FIG. 6.

A planar stretch ratio is also known as Blow Up Ratio or BUR. The axial stretch ratio preferably is at least greater than 1.7, more preferably greater than about 2.2, such as for example between 2.3 and 3.2. The axial stretch length of the preform or preform assembly and height of the container can be defined as the maximum axial distance between the inside of the bottom forming portion and the part of the neck where stretching is initiated.

In table 1 a range for a planar stretch ratio is given, which is preferred, for each of the preform/container combinations disclosed. The minimum ratio is preferred for mechanical stability and resistance to migration of $CO_2$ and/or $O_2$ in containers for holding carbonated beverages. The maximum preferred planar ratio is defined by the PET material itself. A preferred ratio is given as target.

In table 1 a range for an axial stretch ratio is given, which is preferred, for each of the preform/container combinations disclosed. The minimum ratio is preferred for even wall distribution, specifically an even wall thickness for the wall of the body of the container, especially between the shoulder and the bottom. The maximum preferred axial stretch ratio is defined experience obtained in the prior art. A preferred ratio is given as target.

In table 1A here below for the outer preform and inner preform separately axial, hoop and planar stretch ratios are given, for preform sets such as for example shown in FIGS. 1, 2 and 3, especially FIG. 1 or 2. As can be seen from this table the stretch rations for the outer preforms are generally slightly higher than the target as defined in table 1, whereas the stretch rations for the inner preforms are generally slightly lower than said target ratios.

TABLE 1A

|  | 10 L | | 20 L | | 30 L | |
| --- | --- | --- | --- | --- | --- | --- |
|  | outer | inner | outer | inner | outer | inner |
| axial | 2.3 | 2.4 | 2.6 | 2.7 | 2.5 | 2.6 |
| hoop | 3.7 | 4.5 | 3.6 | 4.4 | 3.7 | 4.6 |
| planar | 8.5 | 11.0 | 9.1 | 11.9 | 9.2 | 11.9 |

It is clear that in preform-in-preform or layered preform sets there will be differences in the given ratios. Different considerations will or can apply in the choices of for example materials used for the preforms, especially inner and outer preform, and for distribution of material over said inner and outer preform or layers. Such considerations can for example include:

The outer preform should, during blow moulding, preferably not be under-stretched, meaning that the outer preform should be sufficiently stretched, preferably in all directions, in order to ensure stretching in the entire wall to a sufficient degree in order to obtain the desired orientation of the molecules. To this end the inner preform has to be designed in accordance therewith, which may mean that it has to be designed such that substantially maximum stretch ratios for the inner preform are obtained during blow moulding;

The inner preform is preferably designed with a relatively small wall thickness, compared to the wall thickness of the outer preform, in order to have minimum impact on the stretch ratios of the outer preform;

The inner preform is preferably designed with a relatively small wall thickness such that the inner container has a very small wall thickness in order to improve delamination and folding during pressurising thereof for dispensing content thereof, such as beverage;

The inner preform preferably has a relatively small wall thickness because of the material used and, especially additives added to the inner preform material, such as for example colorant, scavengers, particles, especially silver coloured particles as discussed for inter alia obtaining a roughened surface or surface part, and because for the inner preform virgin material or higher quality plastic may be used, making it costly per weight unit material, possibly more costly than the material of the outer preform;

The inner preform may be designed having a wall thickness as small as possible for proper injection moulding, which minimum wall thickness may be defined at least in relation to the maximum flow paths during injection moulding;

The outer preform may be designed having a relatively large wall thickness, compared to the wall thickness of the inner preform or other layers, such that for example thermal stability and safety of the container are obtained;

The outer preform may be designed having a relatively large wall thickness, wherein the outer preform may be made from plastic material being highly recyclable, for example because of no or only small amounts of additives, and the plastic material used itself can at least partly be recycled material, which may reduce cost;

The outer preform may have a wall thickness as large as possible in view of injection moulding of the preform without thermal crystallisation.

Clearly for preform assemblies according to the present disclosure different embodiments are possible, depending on for example choices made based on the above given considerations, which may lead to compromises with respect to for example stretch ratios, wall thicknesses, preform designs, choices of materials and additives and the like. Such choices can for example be made depending on the content which will be stored inside the container, the pressure of the content and the desired or allowable pressure used for compressing for example the container or the inner container, safety requirements and the like, which will be readily known to the person skilled in the art.

It has been recognised in this description that the cooling of preform is a factor in preventing crystallisation of the plastics material, meaning that if so desired the cooling can be regulated such that the preform or preforms are kept substantially amorph. Cooling time is defined by:
1. wall thickness, especially maximum wall thickness of the preform
2. Injection temperature of the plastics material
3. Mould wall temperature, especially average mould wall temperature at injection
4. Ejection temperature plastic material
5. Heat conductive coefficient plastic material.

For containers for carbonated beverages such as beer and soft-drinks, having a relatively large volume, such as above 10 litters, the hoop ratio appears to be important and is preferably above 10.

The cooling time is dependent on inter alia the wall thickness, especially the maximum wall thickness squared (wall thickness to the power of two).

It has been recognised that the cooling time can be kept short enough to prevent orientation of the molecules in the wall of the preform or preforms. With preforms having a wall thickness of more than 8 mm, more specifically more than 6 mm the heat transfer from the plastic to the mould is insufficient to prevent such orientation in standard plastics, especially in standard PET. Even lowering the mould temperature has proven to be insufficient with thicker walls in preforms. Crystalline plastics, especially PET occurs in three states:
  Amorphous, non-orientated and translucent, clear if not coloured;
  Thermally crystallized, that is by means of relative slow cooling down of the melted material; and
  Strain-induced crystallized, such as in stretch blow moulding.

In the present description the preforms are preferably injection moulded from crystallizing plastic, especially PET such as standard PET, preferably with such wall thickness that the second state is prevented.

In FIG. 2 an embodiment of a preform assembly 1 is shown, in which a space 31 is provided between the first and second preform 2, 3, extending between at least part of the body forming portions 8, 10 of the preforms 2, 3. Spacers 32 can extend in said space keeping the inner and outer preforms at least partly spaced apart. In this embodiment the space 31 is closed off to the environment at the neck 4, especially at the free edge 23 of the first preform. In an embodiment a medium such as a fluid or gas, for example an inert gas such as $N_2$ or a gas as $CO_2$ or air is inserted in the space 31. When blow moulding a container 20 from the assembly 1 the medium in the space 31 may be pressurised, thereby strengthening the container 20. This can have the advantage that a reduced wall thickness can be used for at least one of the layers 2A, 3A, without compromising the strength of the container. In an embodiment an opening 40 can be provided, for example in the neck 4, opening into the space 31, which opening can be closed off by a valve or seal 41. This opening 40 can be opened, for example by opening the valve or piercing the seal 41. The opening can be or can be brought into communication with the environment, such that when opening the opening pressure in the space can be brought back to atmospheric pressure or at least can be reduced. In an embodiment the space 31 can be brought to under pressure. By reducing the pressure the container 20 or at least the body 5 thereof can be reduced in stiffness, allowing more easy compression, for example in a pressure space of a dispensing device as described here above, for dispensing the content of the container 20, or after it has been emptied to a desired degree, in order to reduce the volume of the empty container which has to be discarded or returned for recycling. This can have important benefits for the environment.

Figure 8:
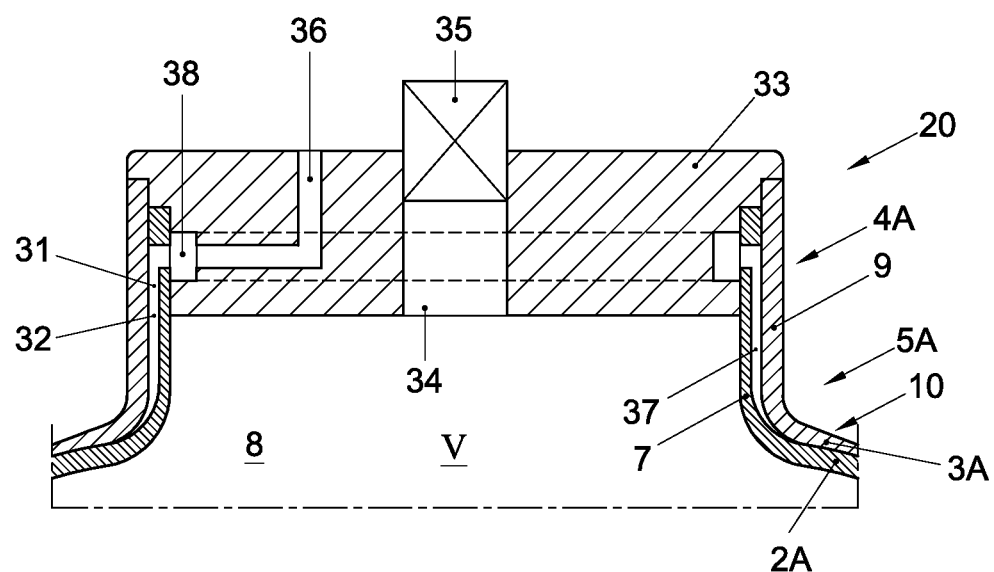
FIG. 8 schematically a neck portion of a container with a closure, in a second embodiment.

FIG. 3 schematically shows a preform assembly 1 in a further embodiment, in which a preform assembly of at least a first and second preform 2, 3 is inserted into a third preform 43 or a third preform is inserted into the first preform, preferably with a wall thickness W7 smaller than the wall thicknesses W1, W2 of the first and second preforms 2, 3. When blow moulding this preform assembly 1 into a container 20, it will have three layers 2A, 3A, 43A, as is shown in FIG. 5. The inner layer preferably is highly flexible compared to at least one of the other layers 2, 3 or the other layers 2, 3 combined. The layer 43A can enclose the beverage and can easily deform when pressurising the beverage. In an embodiment an assembly 1 having a neck 4 as shown in FIG. 1A or 8 can be used, wherein opening 30 can be provided as discussed earlier, in the neck area of the inner most preform 43 or outer preform or between the neck regions, opening into the space 31 between the inner most layer 43A and the first layer 2A, which will lie against the inside of the second layer 3A in a manner as described here before. In this embodiment a pressure fluid can be brought into a space 31 between the inner most, third layer 43A and the first layer 2A, wherein the first and second layers 2A, 3A can in an embodiment form a relatively rigid, pressure resistant outer container. By feeding pressurised fluid, such as gas, for example air or an inert gas into the space 31 the inner most layer 43A of a container 20 as shown in FIG. 5, blown from such preform assembly 1, will deform, pressurising the beverage therein. This means that beverage can be dispensed through the dispense opening 34 and/or valve 35 under pressure. In an alternative embodiment the inner most layer 43A can in fact be formed solely or additionally by the first container 2A, the space 31 being provided, as discussed before, between the inner and outer preforms 2, 3 and containers 2A, 3A respectively.

The space 31 can be replaced or augmented by a coating or layer provided on the interface between the first and second preform, over for example the body forming portions thereof or part thereof. The coating or layer can for example be a layer having barrier properties, for example preventing migration of gas into or out of the inner volume V. The coating or layer can for example prevent coupling of the first and second preform or wall part of the container, or can promote such coupling. The layer or coating can provide colouring, can prevent or enhance heat transport through the interface between the preforms, can be a layer preventing explosion of the container, such as for example but not limited to netting, layering or such means.

In embodiments of preforms and containers such protective layer can for example be but is not limited to a layer comprising or consisting of an impact resistance enhancing material, such as but not limited to polyvinylbutyral. In an embodiment the layer can be formed between the preforms 2, 3 and/or layers 2A, 3A of the container by applying the material in a dissolved state, for example in but not limited to ethanol, such that after forming the preform assembly 1 and/or the container 2 is will set by disappearance of or reaction with the solvent and/or the plastics materials of one or both of the adjacent preforms 2, 3 or layers 2A, 3A of the container 20. In another embodiment the layer can be provided on one or both of the preforms, preferably on at least one of adjacent surfaces, for example by co-injection or co-extrusion, and can then be stretch blow molded with the preform assembly 1. The layer can also be provided on an outer side of the outer preform and/or on an outer side of the container 20. Cross linkers can be added to the material of the layer, such as the polyvinylbutyral, for enhancing mechanical properties thereof.

A preform assembly 1 for blow moulding a container 20 can comprise injection moulding a first preform 2 and a second preform 3, preferably both with a wall thickness of less than about 8 mm, more preferably less than about 6 mm. The first preform 2 can be inserted into the second preform 3 and/or the second preform 3 can be provided over the first preform 2. In an embodiment the first 2 and second preform 3 can be injection moulded in an injection moulding apparatus, wherein the first preform 2 is inserted into the second preform 3 within said injection moulded apparatus. In another embodiment the first 2 and second preform 3 can be injection moulded in an injection apparatus, wherein the second preform 3 can be provided over the first preform 2 within said injection moulded apparatus. In still another embodiment the first preform 2 can be injection moulded within the second preform 3. In a further alternative embodiment the second preform 3 can be injection moulded over the first preform 4. In another alternative embodiment the preforms 2, 3 can be injection moulded, where after the preforms are assembled outside the or each injection moulding apparatus. In such embodiment the preforms 2, 3 can be shipped separately to an assembling system, for example near or in line with a blow moulding apparatus and/or a bottling apparatus or line, wherein the preforms can be assembled directly before bottling beverage. In such embodiment one or both of the preforms can be heated separately and assembled in heated condition.

When blow moulding a container from a preform set, especially according to for example FIG. 2 or 3, a or the space 31 between the inner and outer container can be used for pressurising the inner container.

Using different preforms assembled into one assembly prior to blow moulding, especially stretch blow moulding integrally, the safety can be improved, especially for carbonated beverages, since one of the preforms can be blown into a container part able to resist high pressure, whereas the other can be designed for optimal beverage containing. In another embodiment safety means can be included between the preforms, such as a safety layer, for example glued to one or both of the preforms and/or walls of the body of the container.

Preforms for containers of the Bottle-in-Bottle (BIB) or Bottle-in-Container (BIC) type containers are commonly injection moulded and then assembled, wherein the preforms preferably have smooth inner and outer surfaces, such that they can easily be released from the moulds, especially from a moulding core, with as little draft as possible, whereas the smooth surfaces facing each other when assembling allow easy assembling. Moreover a smooth surface is preferable for reason of sustainability of the moulds. When blow moulding a container from such preform moreover the surfaces are stretched and, for the outer preform, pushed against a smooth inner surface of the blow mould or, for the inner preform, against the smooth inner surface of the outer preform, further smoothening the surfaces. Thus in the prior art the facing surfaces of the inner and outer containers are smooth, that is having a surface roughness of below 0.1 Ra, for example between 0.05 and 0.1 Ra. Such surface smoothness is especially used in preforms and containers made of PET or a PET blend or similar plastics.

It has been recognised that in prior art containers of the BIB or BIC type containers, having at least an inner container and an outer container, wherein the inner container has to be released or pushed away from the outer container or vice versa, it often requires undesirably high pressure of a pressure fluidum, especially gas to be inserted into a space or interface between the inner and outer container in order to push the containers or layers sufficiently apart. This may be the result of the inner and outer containers and/or layers sticking to each other, due to for example heating of the preforms during blow moulding, chemical bonding, chemical and/or mechanical adherence or the like.

In the present disclosure it has been recognised that by providing at least one of the inner and outer container or layer of a BIC or BIB type container facing a surface of the other of the inner and outer container or layer at least partly with a relatively rough surface, surprisingly release of the said surfaces or at least facing surface areas is possible with significantly less pressure of a gas inserted in between said surfaces or surface areas. The surface roughness of the said area or region is preferably above 0.1 Ra, more specifically surface roughness is at least 0.25 Ra, preferably between 0.25 and 2, more preferably between 0.25 and 1. The said surface roughness is for example 0.30 Ra or more. Alternatively or additionally there is provided a difference in surface roughness of two facing surface areas of adjacent containers 2A, 3A, which difference is preferably above 0.1 Ra, more specifically the difference is at least 0.25 Ra, preferably between 0.25 and 2, more preferably between 0.25 and 1. The said difference is surface roughness is for example 0.30 Ra or more. The surface roughness can be measured on the container after blow moulding the container from a set 1 of preforms 2, 3, in any suitable and known manner, especially in accordance with ISO4287 or similar norms, especially after integral blow moulding, for example but not limited to by at least partly separating the inner and outer container and/or by measurement through the outer container.

In embodiments the inner container and/or outer container can have said surface roughness on at least part of a surface, wherein the wall or layer forming said surface comprises particles enclosed in the wall, in or between the plastic forming chains of the plastic wall of the container, such as monomers and/or polymers. The particles can be made of or at least contain material different from the plastic of the wall of said container, especially metal or metalized particles. The particles can be or can contain flakes, especially metal flakes, more particularly aluminum flakes. The particles can form between 0.5 and 5%, in particular between 0.5% and 2.5%, more particular between 0.5% and 2% percent, by weight, of the total weight of the relevant preform or container cq layer 2, 3, 2A, 3A.

It has surprisingly be found that by adding such particles to the plastic material, such as for example to a PET or PET blend, from which the relevant preform or preforms is or are formed, after blow moulding of a container from such preform a surface region of such container at the area of the wall formed by the material containing such particles will have a relatively rough surface, compared to a container blow moulded from a similar preform made of the same material not containing such particles. The surface roughness has been shown to be raised by at least about 0.1 Ra compared to such similar container not having the particles, and may even be raised about 0.3 to 0.35 Ra or more. Even though the largest dimension of the particles may be substantially smaller than the wall thickness W5 or W6 of the container 2A, 3A formed. The particles may have dimensions in the order of μm, whereas the wall thickness of the containers formed, especially the inner container, will be in the order of tenths of millimeters or more.

In embodiments the particles can, at least when they are mixed into the plastic mass from which a preform is to be formed, be provided with or contained in a layer of a material having a lower melting point that of the particles and/or the plastic. Such layer can for be a wax or wax type material, preferably a wax type material which is not precipitated from the preform or container during and/or after blow moulding a container from said set of preforms. The layer can be largely or entirely be non-polymeric or non polymer based. The said material can have affinity with the plastic material, especially the monomers and/or polymers of the plastic, for example through polarity, chemical binding or the like. Alternatively the said material can be such that it does not have an affinity with the polymers. The particles can, including or excluding said material can be substantially evenly dispersed throughout the plastic material or can be unevenly dispersed, for example such that there are more particles near one or both surfaces of the wall.

Additionally or alternatively at least one of the preforms has been roughened at least in part, after injection moulding thereof, and/or wherein at least one of the preforms has been injection moulded in a mould having an at least partly roughened mold surface. Such method is especially useful when only part of an outer surface of an inner preform or part of an inner surface of an outer preform should have such roughened surface. For example only a shoulder forming portion of such preform or container.

In embodiments at least one of the preforms can have at least one surface area, which can be part or all of an inner and/or outer surface of the preform, with surface roughness of above 2 Ra, more preferably above 4 Ra, even more preferably above 6 Ra, such as for example between about 6 and 10 Ra or more. The surface roughness of said surface area of the preform or at least of a mould surface for forming said area can for example be about 9.4 Ra.

In embodiments the container is preferably such that the inner container can be compressed by said pressurizing medium at a pressure below 2 Bar absolute.

In embodiments an outer surface part of the neck region and/or shoulder forming region of the inner container and/or an inner surface part of the neck region and/or shoulder forming portion of the outer container has a surface roughness of at least 0.1 Ra. The further surface parts of the outer surface of the inner container and/or the inner surface of the outer container of at least body forming portions thereof can for example either have the same surface roughness or a lower surface roughness.

In embodiments the outer container is transparent, and the inner container is opaque or non-transparent, having preferably a light reflecting outer appearance, such as silver colored, which may be combined with different colours, such as but not limited to brown, yellow, amber, green, red or black.

In embodiments a Preform set for integrally blow moulding a container, especially according to any one of the previous claims, comprising at least an outer preform and an inner preform, fitting at least partly inside the outer preform, both having a neck forming portion, a shoulder forming portion and a body forming portion, wherein at least a first of the inner and outer preform has a surface region in contact with the other of the inner and outer preform, wherein:

at least part of said region has a surface roughness of at least 0.1 Ra and/or a surface roughness which is at least 0.1 Ra higher than the surface roughness of the surface area of the other of the inner and outer preform with which it is in contact and/or at least part of said region has a surface roughness such that in a container integrally blow moulded from said assembly of preforms the surface area of the container formed from said surface region has a surface roughness of at least 0.1 Ra and/or a surface roughness of at least 0.1 Ra higher than the surface roughness of an adjacent surface area of the adjacent container.

Preferably the first preform is the inner preform.

Figure 12A:
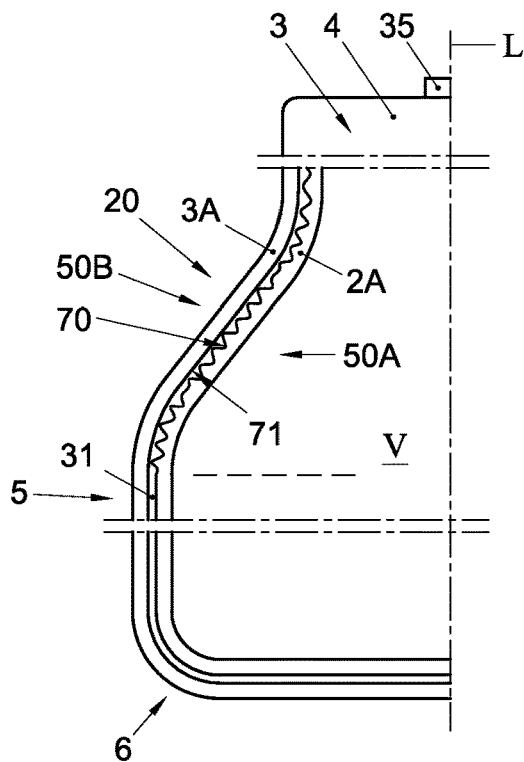
FIGS. 12A and B schematically and partially in cross section part of a container, showing a surface region having a surface roughness.

FIG. 12A discloses schematically a container 20, partly in cross section, showing an inner container 2A and outer container 3A, the inner container 2A extending inside the outer container 3A. Between the inner and outer container 2A, 3A a space 31 is shown, between facing surface portions 70, 71 of respectively the inner and outer containers 2A, 3A. As can be seen the inner container 2A has a shoulder portion 50A with a surface portion 70 having a surface roughness higher than that of the surface portion 71 adjacent to that of said shoulder portion 50A. The surface area 71 of the neck portion 50B of the outer container 3A opposite the shoulder portion 50A of the inner container 2A in this embodiment has a lower surface roughness than that of the shoulder forming portion 50A of the inner container 2A, for example between 0.05 and 0.1 Ra. It has been shown that such increased surface roughness or difference is surface roughness provides for or at least aids to the effect that in such container 20 the pressure necessary in the space 31 for pushing the inner container or layer 2A inward, away from the outer container or layer 3A is lower than that necessary in a similar container without such relatively rough surface area.

Figure 12B:
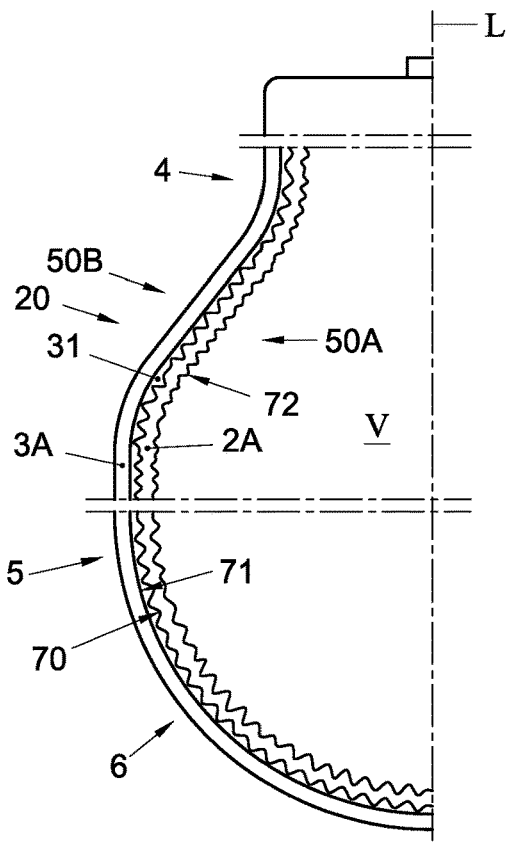

FIG. 12B also discloses schematically a container 20, partly in cross section, showing an inner container 2A and outer container 3A, the inner container 2A extending inside the outer container 3A. Between the inner and outer container 2A, 3A a space 31 is shown, between facing surfaces 70, 71 of respectively the inner and outer containers 2A, 3A. As can be seen the inner container 2A has outer and inner surfaces 70, 72 with a surface roughness higher than that of the surface 71 of the outer container, which can for example be between 0.05 and 0.1 Ra. It has been shown that such increased surface roughness or difference is surface roughness provides for or at least aids to the effect that in such container 20 the pressure necessary in the space 31 for pushing the inner container or layer 2A inward, away from the outer container or layer 3A is lower than that necessary in a similar container without such relatively rough surface area.

As discussed before, the surface roughness of an inner and/or outer container 2A, 3A can be increased by adding particles to the plastic mass from which the relevant inner or outer container is to be formed. These particles, such as for example flakes, for example metal or metallized particles such as metal or metallized flakes, are schematically shown in FIGS. 13A and B, showing in cross section part of a wall of a container.

Figure 13A:
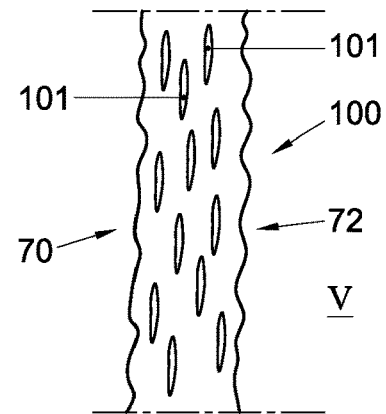
FIGS. 13A and B in two embodiments part of a wall of a container, not on scale, having particles dispersed therein.

In FIG. 13A a cross section of a wall 100 of a container, especially of an inner container 2A is shown, in which particles 101 are dispersed through the plastic forming the wall 100. As can be seen the particles 101 can be relatively evenly be dispersed through the wall 100, for example between monomers and/or polymers of the plastic.

Figure 13B:
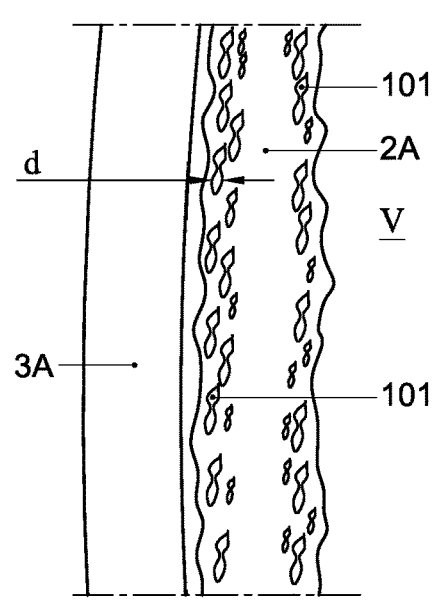

In FIG. 13B a cross section of a container, especially of an inner container 2A and outer container 3A is shown, in which particles 101 are dispersed through the plastic forming the wall 100 of the inner container 2A. As can be seen the particles 101 can be relatively unevenly dispersed through the wall 100, for example between monomers and/or polymers of the plastic. In this embodiment the particles 101 are largely moved towards the surfaces 70, 72 of the wall 100.

In the embodiments shown in FIGS. 13A and B the particles 101 are flakes, having in one direction a dimension d substantially smaller than in two directions perpendicular to said one direction. The flakes 101 are thus substantially sheet or plate shaped, and may be substantially flat or curved. In embodiments the flakes 101 can be metal flakes, especially aluminum flakes providing for a silver colour. The flakes can be orientated substantially parallel to the surfaces 70, 72, which can be the result of the stretching of the wall during blow moulding. Seen in a direction perpendicular to the wall the flakes 101 may partly overlap. The particles provide for a colouring of the relevant container, especially the inner container, especially a silver colour, making the inner container 2A opaque or non-transparent. Apart from the provision of the desired roughened surfaces 70, 72 the fakes 101 also aid in proper heating of the inner and outer containers 2A, 3A prior to and during blow moulding, especially stretch blow moulding. Alternatively the particles 101 can be differently shaped, for example semi spherical or spherical or otherwise.

EXAMPLE

In a comparative example containers were formed according to table 1, 20 liters version. Four different embodiments were formed, all having the same transparent outer preform and container 3, 3A, but different inner preforms and containers 2, 2A. The first two inner preforms were made using an amber colourant, type Holcobatch Amber nr. 131-10-15619, 0.4% in weight of the preform, provided by Holland Colours, The Netherlands. The third and fourth inner preforms were made using a silver colourant, type Holcobatch Silver, 131-1615, 1.0% in weight of the preform, provided by Holland Colours, The Netherlands. As a control sample the same container was made without any colorant. Several containers were formed for each example in order to obtain average readings.

After blow moulding the container 20 the inner container 2A was retrieved by removing the outer container 3A, were after surface roughness was measured on the outside surface of samples taken from the inner container in the center of the body.

In the first and third examples the inner preforms were injection moulded in a mould known from the prior art, used for forming preforms for containers having a surface roughness as low as possible.

The surface roughness of the first inner container, coloured amber, was between 0.05 and 0.1 μm Ra. The surface roughness of the third inner container, coloured silver, was between 0.3 and 0.4 μm Ra.

In the second and fourth examples the inner preforms were injection moulded in a mould similar to that used for the first and third preforms, of which however the inner surface for forming the outer surface of the preform has been roughened to a surface roughness of about 9.4 μm Ra.

The surface roughness of the third inner container, coloured amber, was about 0.4 μm Ra. The surface roughness of the fourth inner container, coloured silver, was about 0.7 μm Ra.

Surface roughnesses were all such that Rz and Ry were relatively low.

Here below table 2 shows the reference numbers for four inner containers as discussed here above.

TABLE 2

First inner container (amber, smooth): AK-BO-0147
Second inner container (amber, textured): AK-BO-0148
Third inner container (silver, smooth): AK-BO-0149
Fourth inner container (silver, textured): AK-BO-0150

Figure 14:
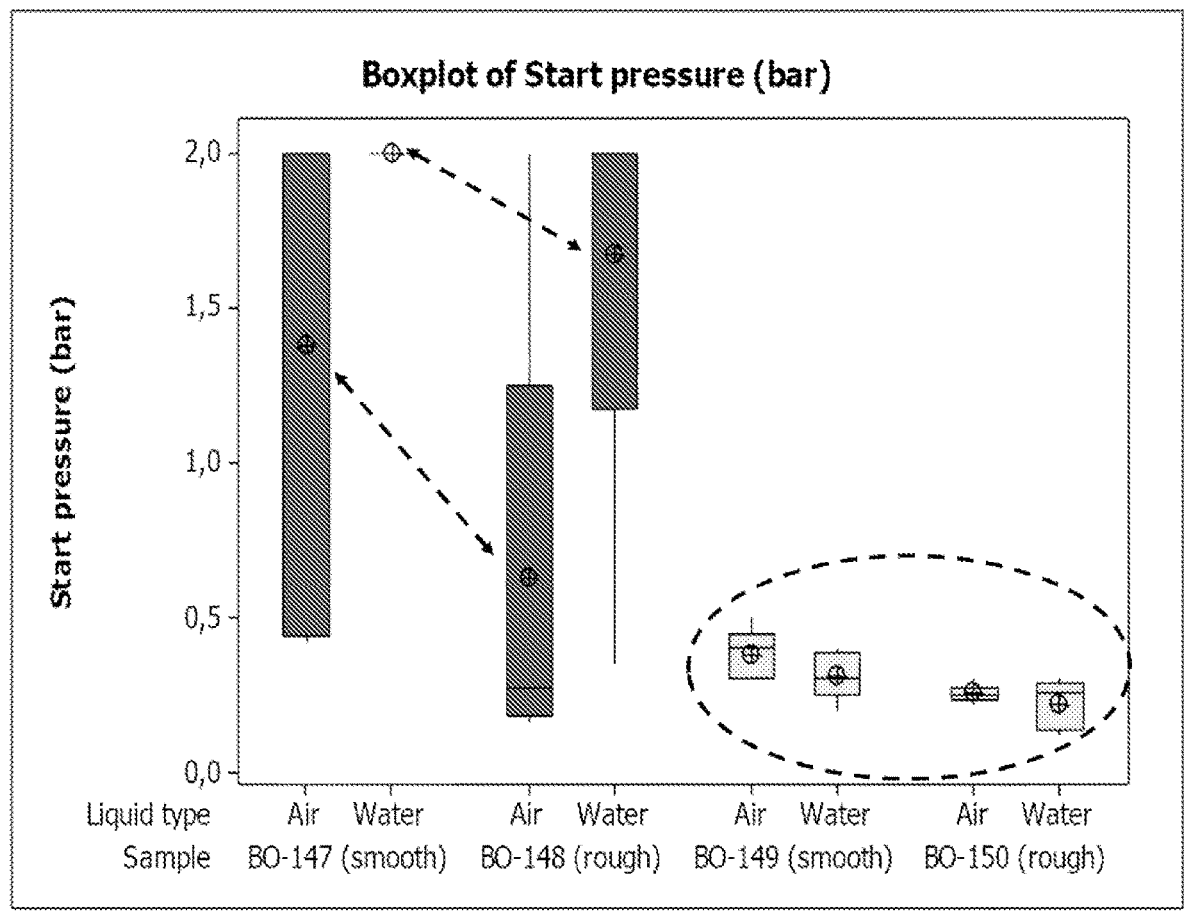
FIG. 14 the starting pressure and spread in starting pressure for four containers.

In FIG. 14 for the four containers 20 formed with the inner containers according to table 2 the starting pressure and spread in starting pressure is given, necessary for initiating the release of the inner container from the outer container when pressurizing the container 20, especially the space 31 between the inner and outer container through an opening 30 in the outer container, to which the upper part of the container 20 was formed according to the embodiment shown in FIG. 10. Of each container examples were tested in which the inner volume V was filled with air and filled with water. In table 3 shown in FIG. 15, the mean value is given of the starting pressure, for the four types of containers, filled with air and filled with water.

From these experiments it is clear that the first and second type container, having the amber coloured inner containers show a larger spread of different starting pressures than the third and fourth type of containers. Moreover the mean starting pressures thereof are significantly higher than the mean starting pressures of the third and fourth type containers. For carbonated or otherwise gaseous contents such as carbonated or otherwise gaseous beverages, preferably the containers 2A, 3A, 20 are designed such that the pressure necessary is such that within the inner container a pressure can be maintained substantially at an equilibrium pressure of the gas within the beverage at a desired dispensing temperature. For beer this may be at a level of about 1.2-1.6 Bar absolute on average (or about 0.2-0.6 barg).

In embodiments of the description the neck portion 8 of the first, inner preform 2 can extend into the neck 9 of the second preform 3 only to such extend that part of the inner surface of the neck portion 9 of the outer, second preform 3 lies free above the neck portion 8 of the inner preform 2. A lid 33 can therein for example be connected to the inner surface of the second preform 9 within the neck. If present a space 31 can be accessible from within the neck or from outside the neck.

Particles 101 can be provided in a different manner, for example as elements provided with a coating, for example metallized, and can have different colours. Preferably the particles provided for a colouring of the relevant preform, especially the inner preform, but are preferably not colorants which are soluble in the plastic material, such as pigments. The particles preferably substantially retain their original mass and/or form and/or constitution, though a covering layer, if applicable, may partly or entirely disappear into the plastic material.

In alternative embodiments containers 20 according to the disclosure can be obtained in which additionally or alternatively part of a surface area can be provided with or as a foamed plastic, especially foamed PET or PET blend layer, for example obtained with MuCell® microcellular foam injection technology as developed by PTI. Such surface area can again aid in release of contacting surface areas of the containers 2A, 3A, at relatively low pressures as previously defined.

The invention is by no means limited to the embodiments described and shown. Many variations are possible with the scope of the invention claimed, including combinations and equivalents of different elements of these embodiments, which are also deemed to have been disclosed.

For example, a preform assembly can be provided with more than two preforms, whereas different protective layers can be provided on parts of or entire surfaces of one or more of the preforms, for example but not limited to barrier layers and/or netting and/or a sleeve for preventing bulging of the container. Different volumes can be provided by amendments to the preforms, whereas the first preform can be made smaller, for example shorter in length, measured along the longitudinal axis L, such that the bottom portion is distanced from that of the second preform, meaning that the first preform will be stretched first, before stretching the second preform too. In case of a compressible container the pressure for compression can be exerted in a different manner, such as but not limited to mechanical or chemical compression means. Other materials can be used, whereas the preforms can be combined in a different manner, such as but not limited to by hand or by robot outside an injection moulding apparatus. An inner liner, deformable layer or deformable container can be provided within a two or more layered container as a separate element. The particles may be dispersed differently in the plastic material and can be partly or fully associated with the plastic chains. They may be coloured differently, as long as they promote roughening of at least part of the surface of the container formed from the preform containing these particles.

These and other, similar amendments can be made to containers, preforms, preform assemblies and/or methods within the scope of the present invention.

The invention claimed is:

1. A container, integrally blow moulded from a preform or preform assembly, comprising an inner container and an outer container with facing surfaces, wherein one of the inner and the outer container is transparent or translucent, and the other of the inner and outer container is opaque or non-transparent, wherein at least part of at least one of the facing surfaces has a surface roughness higher than about 0.1 Ra and/or wherein the difference in roughness of said facing surfaces is at least over a part more than about 0.1 Ra.

2. The container according to claim 1, wherein the outer container is coloured.

3. The container according to claim 1, wherein the inner container has a light reflecting outer appearance.

4. The container according to claim 1, wherein the inner container is silver coloured.

5. The container according to claim 1, wherein said at least one surface is the outer surface of the inner container.

6. The container according to claim 1, wherein the inner and outer container have a neck region, wherein an outer surface part of the neck region of the inner container and/or an inner surface part of the neck region of the outer container has a surface roughness of at least 0.1 Ra.

7. The container according to claim 1, wherein said surface roughness is at least 0.25 Ra.

8. The container according to claim 7, wherein said roughness is at least 0.30 Ra.

9. The container according to claim 1, wherein the inner container and/or outer container comprises particles enclosed in a wall, between plastic forming chains of the plastic wall of the container.

10. The container according to claim 9, wherein the particles are made of or at least contain material different from the plastic of the wall of said container.

11. The container according to claim 9, wherein the particles are or contain flakes.

12. The container according to claim 9, wherein the particles form between 0.5 and 5% by weight of the inner container and/or the outer container.

13. The container according to claim 9, wherein the particles are made of or at least contain metal.

14. The container according to claim 9, wherein the particles are or contain metal flakes.

15. The container according to claim 9, wherein the particles are or contain aluminium flakes.

16. The container according to claim 9, wherein the particles form between 0.5% and 2.5% by weight of the inner container and/or the outer container.

17. The container according to claim 9, wherein the particles form between 0.5% and 2% by weight of the inner container and/or the outer container.

18. The container according to claim 1, wherein said surface roughness is between 0.25 and 2.

19. The container according to claim 1, wherein said surface roughness is between 0.25 and 1.

20. A container, integrally blow moulded from a preform assembly, the container comprising an inner container and an outer container with facing surfaces, wherein one of the inner and the outer container is transparent or translucent, and the other of the inner and outer container is opaque or non-transparent, wherein the container is integrally blow moulded from a preform-in-preform, wherein at least one of the preforms has been roughened at least in part, after injection moulding thereof, and/or wherein at least one of the preforms has been injection moulded in a mould having an at least partly roughened mold surface and/or wherein at least one of the preforms is provided with a foamed surface layer of plastic.

21. A container, integrally blow moulded from a preform assembly, comprising an inner container and an outer container with facing surfaces, wherein one of the inner and the outer container is transparent or translucent, and the other of the inner and outer container is opaque or non-transparent, wherein at least one of or both of the inner container and the outer container are made of PET or a PET blend, or another crystalline or semi-crystalline plastic, wherein the inner container is connected to the outer container at a neck region closing off a space between the inner and the outer container, wherein at least one opening is provided into said space for introducing a pressurizing medium into said space, wherein the container has a body in which the outer container abuts the inner container and wherein the inner container can be compressed by said pressurizing medium at a pressure below 2 Bar absolute.

22. A container blow moulded from a preform assembly comprising a first plastic preform which has been inserted in a second plastic preform, wherein a first layer of the container is formed from the first preform and a second layer, outside the first layer, is formed from the second preform, wherein the plastics material of the first preform has been stretched further for forming the first layer than the plastics material of the second preform for forming the second layer.

23. A container, integrally blow moulded from a preform assembly, comprising an inner container and an outer container with facing surfaces, wherein one of the inner and the outer container is transparent or translucent, and the other of the inner and outer container is opaque or non-transparent, wherein the inner and outer container have a neck region, wherein an outer surface part of the neck region of the inner container and/or an inner surface part of the neck region of the outer container has a surface roughness of at least 0.1 Ra and wherein the further surface parts of the outer surface of the inner container and the inner surface of the outer container of at least body forming portions thereof either have the same surface roughness or a lower surface roughness.

24. A preform set for integrally blow moulding the container, comprising an inner container and an outer container with facing surfaces, wherein one of the inner and the outer container is transparent or translucent, and the other of the inner and outer container is opaque or non-transparent, comprising at least an outer preform and an inner preform, fitting at least partly inside the outer preform, both having a neck forming portion, a shoulder forming portion and a body forming portion, wherein at least a first of the inner and outer preform has a surface region in contact with the other of the inner and outer preform, wherein:
- at least part of said region has a surface roughness of at least 0.1 Ra and/or a surface roughness which is at least 0.1 Ra higher than the surface roughness of the surface area of the other of the inner and outer preform with which it is in contact, and/or
- at least part of said region has a surface roughness such that in a container integrally blow moulded from said assembly of preforms the surface area of the container formed from said surface region has a surface roughness of at least 0.1 Ra and/or a surface roughness of at least 0.1 Ra higher than the surface roughness of an adjacent surface area of the adjacent container.

* * * * *